US010291322B2

(12) United States Patent
Abramov et al.

(10) Patent No.: US 10,291,322 B2
(45) Date of Patent: May 14, 2019

(54) SUPPORTING AN ADD-ON REMOTE UNIT (RU) IN AN OPTICAL FIBER-BASED DISTRIBUTED ANTENNA SYSTEM (DAS) OVER AN EXISTING OPTICAL FIBER COMMUNICATIONS MEDIUM USING RADIO FREQUENCY (RF) MULTIPLEXING

(71) Applicant: Corning Optical Communications LLC, Hickory, NC (US)

(72) Inventors: Yury Abramov, Rosh Ha'ayin (IL); Nissim Atias, Ra'anana (IL); Dror Harel, Hod Hasharon (IL); Hillel Akiva Hendler, Jerusalem (IL); Gavriel Magnezi, Petah Tikva (IL); Yuval Zinger, Charlotte, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/436,972

(22) Filed: Feb. 20, 2017

(65) Prior Publication Data

US 2017/0163343 A1 Jun. 8, 2017

Related U.S. Application Data

(63) Continuation of application No. PCT/IL2015/050843, filed on Aug. 23, 2015.
(Continued)

(51) Int. Cl.
*H04B 10/2575* (2013.01)
*H04B 10/25* (2013.01)

(52) U.S. Cl.
CPC ... *H04B 10/25753* (2013.01); *H04B 10/2504* (2013.01); *H04B 10/25752* (2013.01)

(58) Field of Classification Search
CPC .................................................. H04B 10/2575
See application file for complete search history.

(56) References Cited

U.S. PATENT DOCUMENTS

| 5,627,879 A | 5/1997 | Russell et al. |
| 5,642,405 A | 6/1997 | Fischer et al. |

(Continued)

FOREIGN PATENT DOCUMENTS

| CN | 101547447 A | 9/2009 |
| WO | 2008076432 A1 | 6/2008 |
| WO | 20110152831 A1 | 12/2011 |

OTHER PUBLICATIONS

Valicourt, et al., "Radio-Over-Fiber Access Network Architecture Based on New Optimized RSOA Devices With Large Modulation Bandwidth and High Linearity.", IEEE Transactions on Microwave Theory and Techniques, vol. 58, No. 11, Nov. 2010, pp. 3248-3258.
(Continued)

*Primary Examiner* — David C Payne
*Assistant Examiner* — Pranesh K Barua
(74) *Attorney, Agent, or Firm* — C. Keith Montgomery

(57) ABSTRACT

Embodiments disclosed in the detailed description include supporting an add-on remote unit(s) (RU) in an optical fiber-based distributed antenna system (DAS) over existing optical fiber communications medium using radio frequency (RF) multiplexing. An existing DAS comprises at least one existing head end equipment (HEE) communicatively coupled to a plurality of existing RUs through an existing optical fiber communications medium. In aspects disclosed herein, an add-on RU is added to the existing DAS to support additional wireless communications. No new optical fibers are required to be deployed to support communications to the add-on RU in the existing DAS. Instead, the existing DAS is configured to support the add-on RU through the existing optical fiber communications medium
(Continued)

using RF multiplexing. As a result, the add-on RU can be added to the existing optical fiber-based DAS without adding new optical fibers, thus leading to reduced service disruptions and deployment costs.

13 Claims, 12 Drawing Sheets

Related U.S. Application Data

(60) Provisional application No. 62/041,167, filed on Aug. 25, 2014.

(56) References Cited

U.S. PATENT DOCUMENTS

| | | | |
|---|---|---|---|
| 5,644,622 A | 7/1997 | Russell et al. | |
| 5,657,374 A | 8/1997 | Russell et al. | |
| 6,701,137 B1 | 3/2004 | Judd et al. | |
| 6,785,558 B1 | 8/2004 | Stratford et al. | |
| 6,826,163 B2 | 11/2004 | Mani et al. | |
| 6,826,164 B2 | 11/2004 | Mani et al. | |
| 7,103,377 B2 | 9/2006 | Bauman et al. | |
| 7,127,175 B2 | 10/2006 | Mani et al. | |
| 7,171,244 B2 | 1/2007 | Bauman | |
| 7,254,330 B2 | 8/2007 | Pratt et al. | |
| 7,269,311 B2 | 9/2007 | Kim et al. | |
| 7,469,105 B2 | 12/2008 | Wake et al. | |
| 7,539,509 B2 | 5/2009 | Bauman et al. | |
| 7,546,138 B2 | 6/2009 | Bauman | |
| 7,548,695 B2 | 6/2009 | Wake | |
| 7,639,982 B2 | 12/2009 | Wala | |
| 7,720,510 B2 | 5/2010 | Pescod et al. | |
| 7,761,093 B2 | 7/2010 | Sabat, Jr. et al. | |
| 7,805,073 B2 | 9/2010 | Sabat, Jr. et al. | |
| 7,917,177 B2 | 3/2011 | Bauman | |
| 7,920,858 B2 | 4/2011 | Sabat, Jr. et al. | |
| 9,826,410 B2 * | 11/2017 | Kummetz | H04W 88/085 |
| 2002/0103012 A1 | 8/2002 | Kim et al. | |
| 2004/0017785 A1 | 1/2004 | Zelst | |
| 2004/0106435 A1 | 6/2004 | Bauman et al. | |
| 2004/0198453 A1 * | 10/2004 | Cutrer | H04W 88/085 455/562.1 |
| 2005/0013612 A1 | 1/2005 | Yap | |
| 2005/0147067 A1 | 7/2005 | Mani et al. | |
| 2005/0201323 A1 | 9/2005 | Mani et al. | |
| 2006/0045524 A1 | 3/2006 | Lee et al. | |
| 2006/0045525 A1 | 3/2006 | Lee et al. | |
| 2007/0019956 A1 * | 1/2007 | Sorin | H04J 14/0226 398/71 |
| 2007/0053311 A1 * | 3/2007 | Kim | H04W 88/085 370/280 |
| 2007/0292143 A1 | 12/2007 | Yu et al. | |
| 2008/0063397 A1 | 3/2008 | Hu et al. | |
| 2008/0232305 A1 | 9/2008 | Oren et al. | |
| 2009/0047023 A1 | 2/2009 | Pescod et al. | |
| 2009/0148160 A1 * | 6/2009 | Lim | H04B 10/25751 398/43 |
| 2009/0180407 A1 | 7/2009 | Sabat et al. | |
| 2009/0180426 A1 | 7/2009 | Sabat et al. | |
| 2009/0252139 A1 | 10/2009 | Ludovico et al. | |
| 2009/0297147 A1 * | 12/2009 | Yoshida | H03K 19/00346 398/45 |
| 2009/0316608 A1 * | 12/2009 | Singh | H04W 88/085 370/280 |
| 2009/0316609 A1 | 12/2009 | Singh | |
| 2010/0002626 A1 | 1/2010 | Schmidt et al. | |
| 2010/0002661 A1 | 1/2010 | Schmidt et al. | |
| 2010/0002662 A1 | 1/2010 | Schmidt et al. | |
| 2010/0014494 A1 | 1/2010 | Schmidt et al. | |
| 2010/0142955 A1 | 6/2010 | Yu et al. | |
| 2010/0278530 A1 | 11/2010 | Kummetz et al. | |
| 2010/0329680 A1 | 12/2010 | Presi et al. | |
| 2011/0002687 A1 | 1/2011 | Sabat, Jr. et al. | |
| 2011/0008042 A1 * | 1/2011 | Stewart | H04B 10/25753 398/42 |
| 2011/0026932 A1 * | 2/2011 | Yeh | H04B 10/25759 398/116 |
| 2011/0268449 A1 * | 11/2011 | Berlin | H04B 10/25753 398/115 |
| 2012/0177026 A1 * | 7/2012 | Uyehara | H04B 1/18 370/345 |
| 2012/0230695 A1 | 9/2012 | O'Krafka et al. | |
| 2013/0089332 A1 * | 4/2013 | Sauer | H04J 14/0278 398/72 |
| 2013/0236180 A1 * | 9/2013 | Kim | H04J 14/0236 398/72 |
| 2013/0249292 A1 * | 9/2013 | Blackwell, Jr. | H04B 10/25753 307/31 |
| 2014/0243033 A1 * | 8/2014 | Wala | H04B 7/024 455/517 |
| 2016/0087745 A1 * | 3/2016 | Abramov | H04W 88/085 398/67 |

OTHER PUBLICATIONS

Patent Cooperation Treaty, International Search Report for PCT/IL2015/050966, dated Jan. 20, 2016, 6 pages.

Patent Cooperation Treaty, Search Report and Written Opinion for PCT/IL2015/050843, dated Apr. 20, 2016, 20 pages.

* cited by examiner

SUPPORTING AN ADD-ON REMOTE UNIT (RU) IN AN OPTICAL FIBER-BASED DISTRIBUTED ANTENNA SYSTEM (DAS) OVER AN EXISTING OPTICAL FIBER COMMUNICATIONS MEDIUM USING RADIO FREQUENCY (RF) MULTIPLEXING

CROSS-REFERENCE TO RELATED APPLICATION(S)

This application is a continuation of International Application No. PCT/IL2015/050843, filed Aug. 23, 2015, which claims the benefit of priority under 35 U.S.C. § 119 of U.S. Provisional Application No. 62/041,167, filed on Aug. 25, 2014, the content of which is relied upon and incorporated herein by reference in its entirety.

BACKGROUND

The disclosure relates generally to distribution of data (e.g., digital data services and radio frequency communications services) in a distributed antenna system (DAS), and more particularly to supporting an add-on remote unit(s) (RU) for new or additional communications services over an existing optical fiber communications medium using radio frequency (RF) multiplexing.

Wireless customers are increasingly demanding digital data services, such as streaming video signals. Concurrently, some wireless customers use their wireless devices in areas that are poorly served by conventional cellular networks, such as inside certain buildings or areas where there is little cellular coverage. One response to the intersection of these two concerns has been the use of DASs. DASs can be particularly useful when deployed inside buildings or other indoor environments where client devices may not otherwise be able to effectively receive RF signals from a source. DASs include RUs (also referred to as "remote antenna units (RAUs)") configured to receive and wirelessly transmit wireless communications signals to client devices in antenna range of the RUs. Such DASs may use wireless fidelity (WiFi) or wireless local area networks (WLANs), as examples, to provide digital data services.

A typical DAS comprises head end equipment (HEE) communicatively coupled to a plurality of RUs. The HEE connects to a variety of wireless services, such as wideband code division multiple access (WCDMA), long term evolution (LTE), and WLAN communications services. A plurality of RUs is deployed inside buildings or other indoor environments to form RF antenna coverage areas. Each of the RUs contain, or is configured to couple to, one or more antennas configured to support desired frequency(ies) or polarization to redistribute the variety of wireless services to client devices in the respective RF antenna coverage area. The DAS may employ optical fiber as an optical fiber-based DAS to support reliable downlink distribution of the variety of wireless communications services from the HEE to the RUs and vice versa for uplink distribution. Each RU is communicatively coupled to the HEE through an optical fiber pair—one downlink optical fiber provided for downlink communications and one uplink optical fiber provided for uplink communications. Optical fiber enjoys the benefit of large bandwidth capability with low noise over a conductor-based communications medium. However, fast advancement of wireless technologies and growing user demand for new or additional wireless communications services may exceed the capabilities of the existing, installed RUs in the optical fiber-based DAS even if the installed optical fiber communications medium has additional bandwidth availability to support such new or additional wireless communications services. As a result, new RUs may need to be added to the installed optical-fiber based DAS, but additional optical fiber must be installed to provide optical communications between the new RUs and the HEE.

No admission is made that any reference cited herein constitutes prior art. Applicant expressly reserves the right to challenge the accuracy and pertinency of any cited documents.

SUMMARY

Embodiments disclosed in the detailed description include supporting an add-on remote unit(s) (RU) in an optical fiber-based distributed antenna system (DAS) over existing optical fiber communications medium using radio frequency (RF) multiplexing. An existing optical fiber-based DAS comprises at least one existing head end equipment (HEE) communicatively coupled to a plurality of existing RUs through an existing optical fiber communications medium. The existing HEE is configured to distribute downlink communications signals over an existing downlink optical fiber to the plurality of existing RUs. The plurality of existing RUs is configured to distribute uplink communications signals over an existing uplink optical fiber to the existing HEE. In aspects disclosed herein, an add-on RU is added to the existing optical fiber-based DAS to support additional wireless communications. No new optical fibers are required to be deployed to support communications to the add-on RU in the existing optical fiber-based DAS. Instead, the existing optical fiber-based DAS is configured to support the add-on RU through the existing optical fiber communications medium using RF multiplexing. By supporting the add-on RU in the existing optical fiber-based DAS over the existing optical fiber communications medium that supports the plurality of existing RUs using RF multiplexing, the add-on RU can be added to the existing optical fiber-based DAS without adding new optical fibers, thus leading to reduced service disruptions and deployment costs.

One embodiment of the disclosure relates to a HEE in an optical fiber-based DAS. The HEE comprises an existing downlink communications signal path configured to receive at least one existing downlink electrical RF communications signal. The HEE also comprises an add-on downlink communications signal path configured to receive at least one add-on downlink electrical RF communications signal different from the existing downlink electrical RF communications signal. The HEE also comprises a HEE frontend interface coupled to a downlink optical fiber. The HEE frontend interface is configured to receive the at least one existing downlink electrical RF communications signal from the existing downlink communications signal path via at least one existing downlink RF signal interface. The HEE frontend interface is also configured to receive the at least one add-on downlink electrical RF communications signal from the add-on downlink communications signal path via at least one add-on downlink RF signal interface. The HEE frontend interface is also configured to multiplex the at least one existing downlink electrical RF communications signal and the at least one add-on downlink electrical RF communications signal to generate a downlink multiplexed RF signal. The HEE frontend interface is also configured to convert the downlink multiplexed RF signal into a downlink multiplexed optical signal. The HEE frontend interface is also configured to provide the downlink multiplexed optical signal to the downlink optical fiber.

An additional embodiment of the disclosure relates to a RU system in an optical fiber-based DAS. The RU system comprises an existing RU downlink communications signal path configured to convert at least one existing downlink optical RF communications signal received from at least one existing RU downlink optical signal interface into at least one existing downlink electrical RF communications signal. The RU system also comprises an add-on RU downlink communications signal path configured to convert at least one add-on downlink optical RF communications signal received from at least one add-on RU downlink optical signal interface into at least one add-on downlink electrical RF communications signal different from the at least one existing downlink electrical RF communications signal. The RU system also comprises a RU frontend interface coupled to a downlink optical fiber. The RU frontend interface is configured to receive a downlink multiplexed optical signal from the downlink optical fiber. The RU frontend interface is also configured to convert the downlink multiplexed optical signal into a downlink multiplexed RF signal. The RU frontend interface is also configured to de-multiplex the downlink multiplexed RF signal and generate the at least one existing downlink electrical RF communications signal and the at least one add-on downlink electrical RF communications signal. The RU frontend interface is also configured to convert the at least one existing downlink electrical RF communications signal into the at least one existing downlink optical RF communications signal. The RU frontend interface is also configured to convert the at least one add-on downlink electrical RF communications signal into the at least one add-on downlink optical RF communications signal. The RU frontend interface is also configured to provide the at least one existing downlink optical RF communications signal to the existing RU downlink communications signal path via the at least one existing RU downlink optical signal interface. The RU frontend interface is also configured to provide the at least one add-on downlink optical RF communications signal to the add-on RU downlink communications signal path via the at least one add-on RU downlink optical signal interface.

An additional embodiment of the disclosure relates to an optical fiber-based DAS. The optical fiber-based DAS comprises a HEE. The HEE comprises at least one existing radio interface, at least one add-on radio interface, and at least one existing optical interface module (OIM) coupled to the at least one existing radio interface and the at least one add-on radio interface. The at least one existing OIM further comprises a HEE frontend interface. The optical fiber-based DAS also comprises a RU system. The RU system comprises at least one existing RU, at least one add-on RU, and a RU frontend interface coupled to the at least one existing RU and the at least one add-on RU. The optical fiber-based DAS also comprises at least one downlink optical fiber connecting the HEE frontend interface to the RU frontend interface. The optical fiber-based DAS also comprises at least one uplink optical fiber connecting the RU frontend interface to the HEE frontend interface.

An additional embodiment of the disclosure relates to a method for adding an add-on RU in an existing optical fiber-based DAS. The method for adding an add-on RU in an existing optical fiber-based DAS comprises upgrading an existing RU system in the existing optical fiber-based DAS. The method for upgrading the existing RU system in the existing optical fiber-based DAS comprises providing an add-on RU. The add-on RU is configured to receive an add-on downlink electrical RF communications signal for an add-on wireless communications service over an existing downlink optical fiber coupled to an existing RU, wherein the existing RU is configured to receive an existing downlink electrical RF communications signal for an existing wireless communications service over the existing downlink optical fiber. The add-on RU is also configured to provide an add-on uplink electrical RF communications signal for the add-on wireless communications service over an existing uplink optical fiber coupled to the existing RU, wherein the existing RU is configured to provide an existing uplink electrical RF communications signal for the existing wireless communications service over the existing uplink optical fiber. The method for upgrading the existing RU system in the existing optical fiber-based DAS also comprises disconnecting the existing downlink optical fiber and the existing uplink optical fiber from the existing RU. The method for upgrading the existing RU system in the existing optical fiber-based DAS also comprises installing a RU frontend interface. The method for upgrading the existing RU system in the existing optical fiber-based DAS also comprises connecting the add-on RU and the existing RU to the RU frontend interface. The method for upgrading the existing RU system in the existing optical fiber-based DAS also comprises connecting the RU frontend interface to the existing downlink optical fiber and the existing uplink optical fiber. The method for adding an add-on RU in an existing optical fiber-based DAS also comprises upgrading an existing HEE in the existing optical fiber-based DAS. The method for upgrading the existing HEE in the existing optical fiber-based DAS comprises providing an add-on radio interface module (RIM). The add-on RIM is configured to receive the add-on downlink electrical RF communications signal from an add-on wireless communications service for the add-on wireless communications service. The RIM is also configured to provide the add-on uplink electrical RF communications signal to the add-on wireless communications service for the add-on wireless communications service. The method for upgrading the existing HEE in the existing optical fiber-based DAS also comprises identifying an existing optical interface module (OIM) coupled to the existing downlink optical fiber and the existing uplink optical fiber, wherein the existing downlink optical fiber and the existing uplink optical fiber connect to the RU frontend interface. The method for upgrading the existing HEE in the existing optical fiber-based DAS also comprises installing a HEE frontend interface, coupling the HEE frontend interface with the existing OIM, and connecting the add-on RIM to the existing OIM.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Various embodiments will be further clarified by the following examples.

Embodiments disclosed in the detailed description include supporting an add-on remote unit(s) (RU) in an optical fiber-based distributed antenna system (DAS) over existing optical fiber communications medium using radio frequency (RF) multiplexing. An existing optical fiber-based DAS comprises at least one existing head end equipment (HEE) communicatively coupled to a plurality of existing RUs through an existing optical fiber communications medium. The existing HEE is configured to distribute downlink communications signals over an existing downlink optical fiber to the plurality of existing RUs. The plurality of existing RUs is configured to distribute uplink communications signals over an existing uplink optical fiber to the existing HEE. In aspects disclosed herein, an add-on RU is added to the existing optical fiber-based DAS to support additional wireless communications. No new optical fibers are required to be deployed to support communications to the add-on RU in the existing optical fiber-based DAS. Instead, the existing optical fiber-based DAS is configured to support the add-on RU through the existing optical fiber communications medium using RF multiplexing. By supporting the add-on RU in the existing optical fiber-based DAS over the existing optical fiber communications medium that supports the plurality of existing RUs using RF multiplexing, the add-on RU can be added to the existing optical fiber-based DAS without adding new optical fibers, thus leading to reduced service disruptions and deployment costs.

Figure 1:
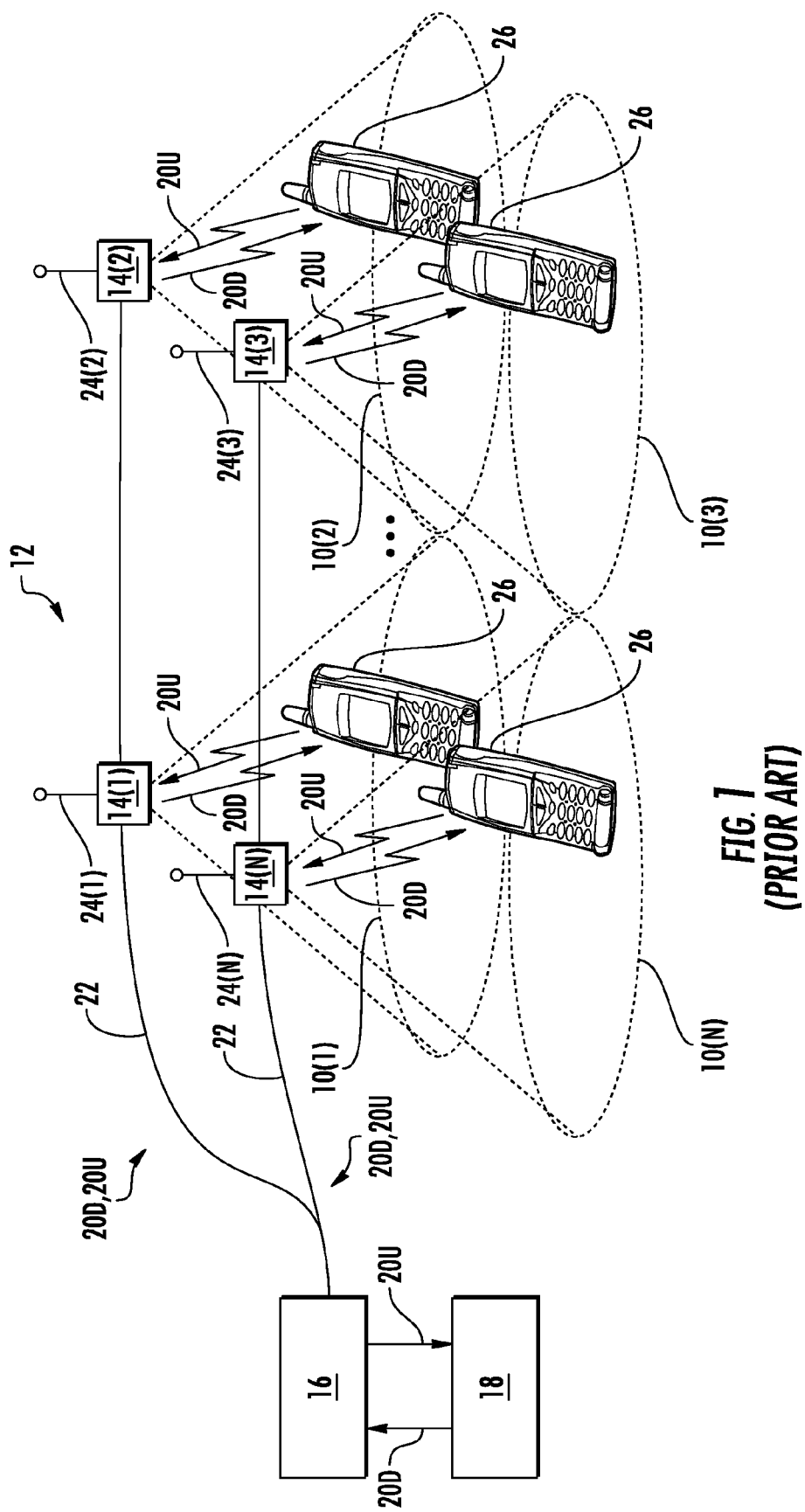
FIG. 1 is a schematic diagram of an exemplary distributed antenna system (DAS)
Figure 2A:
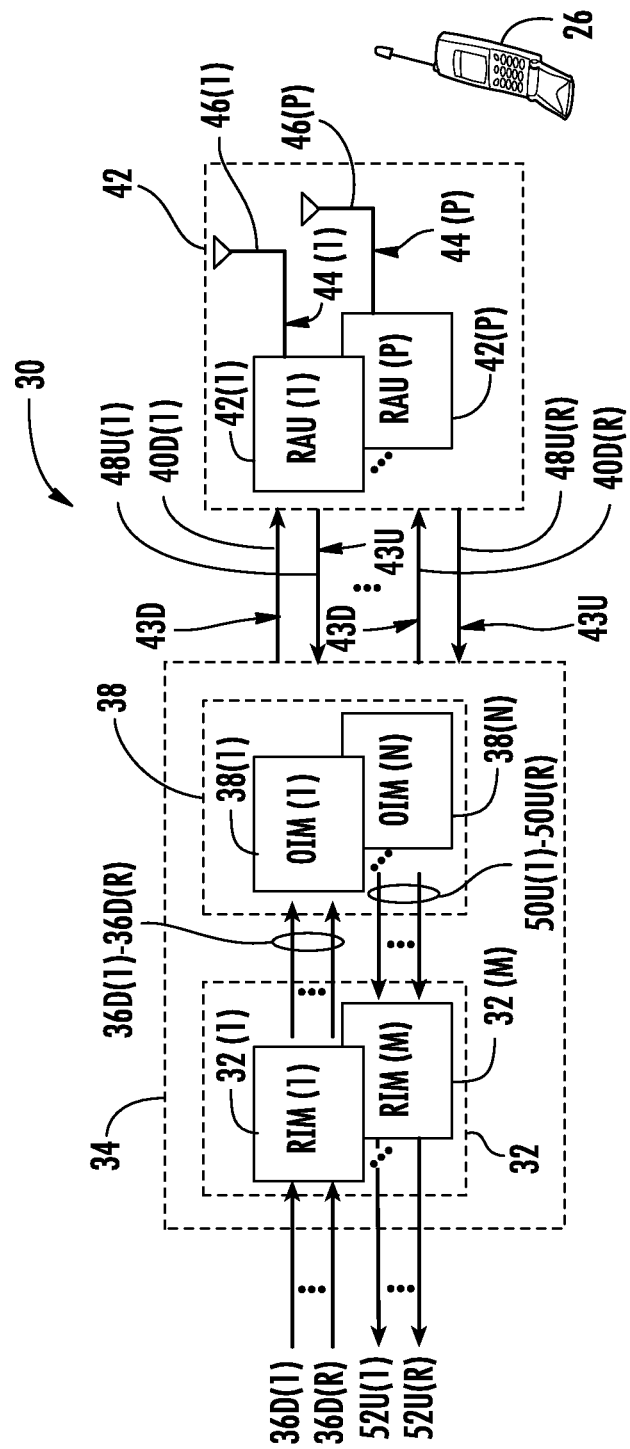
FIG. 2A is a schematic diagram of an exemplary optical fiber-based DAS configured to distribute wireless communications services to a plurality of remote units (RUs)
Figure 2B:
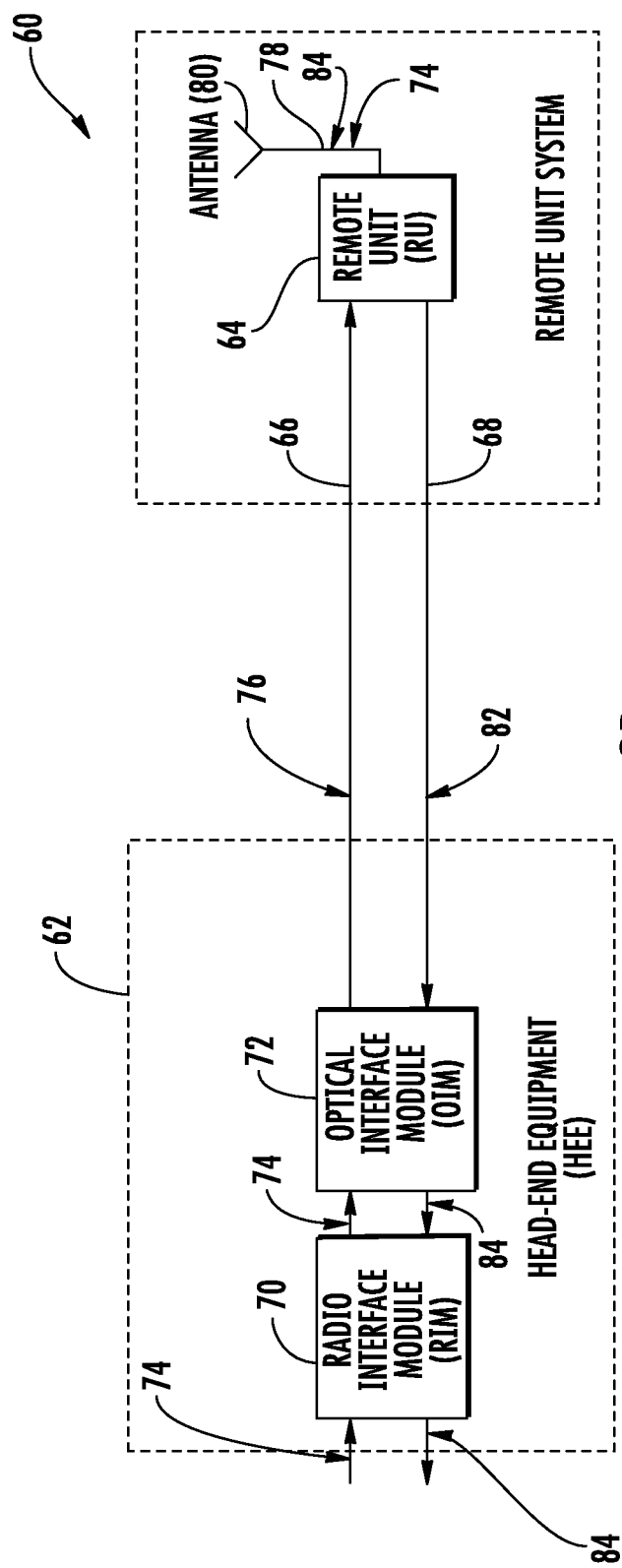
FIG. 2B is an exemplary schematic diagram illustrating an optical fiber-based DAS showing a head end equipment (HEE) communicatively coupled to a RU over an existing downlink optical fiber and an existing uplink optical fiber.
Figure 3:
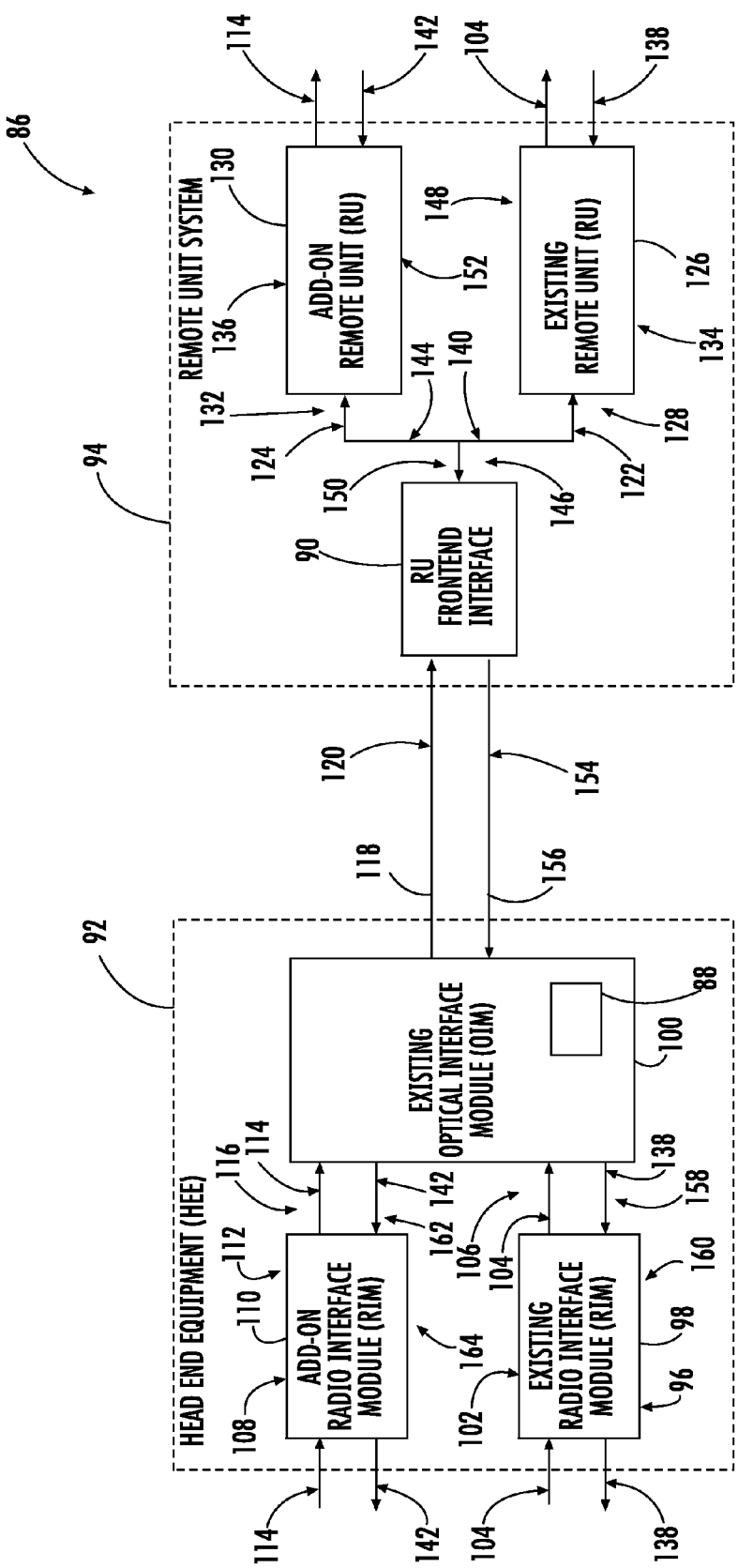
FIG. 3 is a schematic diagram of an exemplary optical fiber-based DAS configured to support an add-on RU over an existing optical fiber communications medium by including a HEE frontend interface and a RU frontend interface in an existing HEE and an existing RU system, respectively.

Before discussing examples of supporting add-on RUs in an optical fiber-based DAS over existing optical fiber communications medium using RF multiplexing starting at FIG. 3, a discussion of an exemplary existing optical fiber-based DAS that employs optical fiber communications medium to support wireless communications services to a plurality of RUs is first provided with reference to FIGS. 1-2B. The discussion of specific exemplary aspects of supporting the add-on RU in the DAS over existing optical fiber communications medium using RF multiplexing begins with reference to FIG. 3.

FIG. 1 illustrates distribution of communications services to coverage areas 10(1)-10(N) of a DAS 12, wherein 'N' is the number of coverage areas. These communications services can include cellular services, wireless services such as RF identification (RFID) tracking, wireless fidelity (Wi-Fi), local area network (LAN), WLAN, and combinations thereof, as examples. The coverage areas 10(1)-10(N) may be remotely located. In this regard, the remote coverage areas 10(1)-10(N) are created by and centered on remote antenna units 14(1)-14(N) connected to a HEE 16 (e.g., a head end controller or head end unit or central unit). The HEE 16 may be communicatively coupled to a base station 18. In this regard, the HEE 16 receives downlink RF communications signals 20D from the base station 18 to be distributed to the remote antenna units 14(1)-14(N). The remote antenna units 14(1)-14(N) are configured to receive downlink RF communications signals 20D from the HEE 16 over a communications medium 22 to be distributed to the respective coverage areas 10(1)-10(N) of the remote antenna units 14(1)-14(N). Each remote antenna unit 14(1)-14(N) may include a RF transmitter/receiver (not shown) and a respective antenna 24(1)-24(N) operably connected to the RF transmitter/receiver to wirelessly distribute the communications services to client devices 26 within their respective coverage areas 10(1)-10(N). The remote antenna units 14(1)-14(N) are also configured to receive uplink RF communications signals 20U from the client devices 26 in their respective coverage areas 10(1)-10(N) to be distributed to the base station 18. The size of a given coverage area 10(1)-10(N) is determined by the amount of RF power transmitted by the respective remote antenna unit 14(1)-14(N), the receiver sensitivity, antenna gain and the RF environment, as well as by the RF transmitter/receiver sensitivity of the client device 26. Client devices 26 usually have a fixed maximum RF receiver sensitivity, so that the above-mentioned properties of the remote antenna units 14(1)-14(N) mainly determine the size of their respective remote coverage areas 10(1)-10(N).

To illustrate specific aspects related to an optical fiber-based DAS, FIG. 2A is provided. FIG. 2A is a schematic diagram of an exemplary optical fiber-based DAS configured to provide a variety of wireless communications services to a plurality of RUs. In this embodiment, an optical fiber-based DAS 30 is provided that includes optical fiber for distributing RF communication services. The optical fiber-based DAS 30 in this embodiment is comprised of three (3) main components. One or more radio interfaces provided in the form of radio interface modules (RIMs) 32(1)-32(M) in this embodiment are provided in HEE 34 to receive and process downlink electrical RF communications signals 36D(1)-36D(R) from one or more wireless communications services (not shown) prior to optical conversion into downlink optical RF communications signals. The RIMs 32(1)-32(M) provide both downlink and uplink interfaces. The notations "1-R" and "1-M" indicate that any number of the referenced component, 1-R and 1-M, respectively, may be provided. As will be described in more detail below, the HEE 34 is configured to accept a plurality of RIMs 32(1)-32(M) as modular components that can easily be installed and removed or replaced in the HEE 34. In one embodiment, the HEE 34 is configured to support up to eight (8) RIMs 32(1)-32(8).

Each RIM 32(1)-32(M) can be designed to support a particular type of radio source or range of radio sources (i.e., frequencies) to provide flexibility in configuring the HEE 34 and the optical fiber-based DAS 30 to support the desired radio sources. For example, one RIM 32 may be configured to support the Personal Communication Services (PCS) radio band. Another RIM 32 may be configured to support the 700 MHz radio band. In this example, by inclusion of these RIMs 32, the HEE 34 would be configured to support and distribute RF communications signals on both PCS and LTE 700 radio bands. RIMs 32 may be provided in the HEE 34 that support any frequency bands desired, including but not limited to the US Cellular band, Personal Communication Services (PCS) band, Advanced Wireless Services (AWS) band, 700 MHz band, Global System for Mobile communications (GSM) 900, GSM 1800, and Universal Mobile Telecommunication System (UMTS). RIMs 32 may be provided in the HEE 34 that support any wireless technologies desired, including but not limited to Code Division Multiple Access (CDMA), CDMA200, 1×RTT, Evolution—Data Only (EV-DO), UMTS, High-speed Packet Access (HSPA), GSM, General Packet Radio Services (GPRS), Enhanced Data GSM Environment (EDGE), Time Division Multiple Access (TDMA), Long Term Evolution (LTE), iDEN, and Cellular Digital Packet Data (CDPD).

RIMs 32 may be provided in the HEE 34 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

The downlink electrical RF communications signals 36D(1)-36D(R) are provided to a plurality of optical interfaces provided in the form of optical interface modules (OIMs) 38(1)-38(N) in this embodiment to convert the downlink electrical RF communications signals 36D(1)-36D(R) into downlink optical RF communications signals 40D(1)-40D(R). The notation "1-N" indicates that any number of the referenced component 1-N may be provided. The OIMs 38 may be configured to provide one or more optical interface components (OICs) (not shown) that contain optical-to-electrical (O/E) and electrical-to-optical (E/O) converters (not shown), as will be described in more detail below. The OIMs 38 support the radio bands that can be provided by the RIMs 32, including the examples previously described above. Thus, in this embodiment, the OIMs 38 may support a radio band range from 400 MHz to 2700 MHz, as an example, so providing different types or models of OIMs 38 for narrower radio bands to support possibilities for different radio band-supported RIMs 32 provided in the HEE 34 is not required. Further, as an example, the OIMs 38 may be optimized for sub-bands within the 400 MHz to 2700 MHz frequency range, such as 400-700 MHz, 700 MHz-1 GHz, 1 GHz-1.6 GHz, and 1.6 GHz-2.7 GHz, as examples.

The OIMs 38(1)-38(N) each include E/O converters (not shown) to convert the downlink electrical RF communications signals 36D(1)-36D(R) to the downlink optical RF communications signals 40D(1)-40D(R). The downlink optical RF communications signals 40D(1)-40D(R) are communicated over downlink optical fiber(s) 43D to a plurality of remote units provided in the form of remote antenna units (RAUs) 42(1)-42(P). The notation "1-P" indicates that any number of the referenced component 1-P may be provided. O/E converters (not shown) provided in the RAUs 42(1)-42(P) convert the downlink optical RF communications signals 40D(1)-40D(R) back into downlink electrical RF communications signals 36D(1)-36D(R), which are provided over downlinks 44(1)-44(P) coupled to antennas 46(1)-46(P), respectively, in the RAUs 42(1)-42(P) to client devices 26 in the reception range of the antennas 46(1)-46(P).

E/O converters (not shown) are also provided in the RAUs 42(1)-42(P) to convert uplink electrical RF communications signals received from client devices 26 through the antennas 46(1)-46(P) into uplink optical RF communications signals 48U(1)-48U(R) to be communicated over uplink optical fibers 43U to the OIMs 38(1)-38(N). The OIMs 38(1)-38(N) include O/E converters (not shown) that convert the uplink optical RF communications signals 48U(1)-48U(R) into uplink electrical RF communications signals 50U(1)-50U(R) that are processed by the RIMs 32(1)-32(M) and provided as uplink electrical RF communications signals 52U(1)-52U(R).

FIG. 2B provides a simplified optical fiber-based DAS 60 showing a HEE 62 communicatively coupled to a RU 64 over an existing downlink optical fiber 66 and an existing uplink optical fiber 68. The HEE 62 comprises a RIM 70 and an OIM 72. Like RIMs 32 in FIG. 2A, the RIM 70 is configured to receive and process downlink electrical RF communications signals 74 from one or more wireless communications services (not shown) prior to optical conversion into downlink optical RF communications signals 76. The RIM 70 provides both downlink and uplink interfaces. The downlink electrical RF communications signal 74 is provided to the OIM 72, which is the same as the OIM 38 in FIG. 2A, so as to convert the downlink electrical RF communications signal 74 into a downlink optical RF communications signal 76. The OIM 72 supports the radio bands that can be provided by the RIM 70, including the examples previously described in FIG. 2A. The OIM 72 includes E/O converters (not shown) to convert the downlink electrical RF communications signal 74 to downlink optical RF communications signal 76. The downlink optical RF communications signal 76 is communicated over the downlink optical fiber 66 to the RU 64. O/E converters (not shown) provided in the RU 64 convert the downlink optical RF communications signal 76 back into the downlink electrical RF communications signal 74, which is provided over downlink 78 coupled to antenna 80 in the RU 64 for transmission to client devices (not shown) in the reception range of the antenna 80.

E/O converters (not shown) are also provided in the RU 64 to convert uplink electrical RF communications signals 84 received from client devices (not shown) through the antenna 80 into an uplink optical RF communications signal 82 to be communicated over the uplink optical fiber 68 to the OIM 72. The OIM 72 includes O/E converters (not shown) that convert the uplink optical RF communications signal 82 into the uplink electrical RF communications signal 84 that is processed by the RIM 70 and provided as the uplink electrical RF communications signal 84 to the one or more wireless communications services (not shown).

Although the RU 64 in the optical fiber-based DAS 60 in FIG. 2B is designed to support a wide range of RF bands and wireless communication technologies, the optical fiber-based DAS 60 may need to be upgraded over time to meet growing user demands for new wireless communications services and/or to improve existing wireless communications services (e.g., supporting new RF bands, increasing coverage, adding more bandwidth, etc.). As a result, a new RU may need to be added to the optical fiber-based DAS 60. As can be seen in FIG. 2B, a pair of dedicated downlink and uplink optical fibers 66, 68 are installed in the optical fiber-based DAS 60 for communicating the downlink optical RF communications signals 76 and the uplink optical RF communications signals 82, respectively, between the OIM 72 and the RU 64. Accordingly, a new pair of downlink and uplink optical fibers would need to be installed in the optical fiber-based DAS 60 for communicating new downlink and uplink optical RF communications signals associated with the new RU. Given the high deployment cost and service disruption associated with optical fiber installation, it is more desirable if the new RU could be added into the optical fiber-based DAS 60 without adding new optical fibers.

In this regard, as discussed in more detail below, FIG. 3 is a schematic diagram of an exemplary optical fiber-based DAS 86 configured to support an add-on RU over an existing optical fiber communications medium by including a HEE frontend interface 88 and a RU frontend interface 90 in an existing HEE 92 and an existing RU system 94, respectively. For the convenience of discussions in this disclosure, the terms "existing" and "add-on" are used in conjunction with references to a DAS or a DAS element. For example, an existing DAS, an existing RU, an add-on RU, and so on. The term "existing" distinctively indicates a system or an element that has already been installed and functional. An "existing" system or element may not be removed, but may be reconfigured or modified to work with an "add-on" system or element. The term "add-on" distinctively indicates a new system or a new element that is added to the installed DAS for enabling new wireless communications services and/or improving existing wireless communications services.

In this regard, FIG. 3 includes an optical fiber-based DAS 86 that comprises the existing HEE 92 and the existing RU system 94. The existing HEE 92 comprises at least one existing radio interface 96. The existing HEE 92 also comprises at least one existing RIM 98 (also referred to herein as "RIM 98") and at least one existing OIM 100 (also referred to herein as "OIM 100"). In this example, the at least one existing RIM 98 is a specific example of the at least one radio interface 96 and provides at least one existing downlink communications signal path 102 for the existing HEE 92. The at least one existing RIM 98 is configured to receive and process at least one existing downlink electrical RF communications signal 104 from one or more wireless communications services (not shown). The at least one existing RIM 98 provides both downlink and uplink interfaces. The at least one existing downlink electrical RF communications signal 104 is provided to at least one existing downlink RF signal interface 106. To enable at least one add-on RF band and/or wireless communications service, at least one add-on radio interface 108 and at least one add-on RIM 110 (also referred to herein as "add-on RIM 110") are added to the existing HEE 92. In a non-limiting example, the add-on RIM 110 is configured to be the at least one radio interface 108. The add-on RIM 110 provides an add-on downlink communications signal path 112 for the existing HEE 92. Similarly, the add-on RIM 110 is configured to receive and process at least one add-on downlink electrical RF communications signal 114 from one or more wireless communications services (not shown). The add-on RIM 110 also provides both downlink and uplink interfaces. The at least one add-on downlink electrical RF communications signal 114 is provided to at least one add-on downlink RF signal interface 116.

In order to distribute both the at least one existing downlink electrical RF communications signal 104 and the at least one add-on downlink electrical RF communications signal 114 over an existing downlink optical fiber 118, the HEE frontend interface 88 is provided in the existing HEE 92. The HEE frontend interface 88 is coupled to the at least one existing downlink RF signal interface 106 and the at least one add-on downlink RF signal interface 116. In a non-limiting example, the HEE frontend interface 88 may be provided in the existing OIM 100. The HEE frontend interface 88 is configured to transform the at least one existing downlink electrical RF communications signal 104 and the at least one add-on downlink electrical RF communications signal 114 into a downlink multiplexed optical signal 120 to be communicated over the existing downlink optical fiber 118 to the existing RU system 94. More detail about the HEE frontend interface 88 is provided in reference to FIG. 4 below.

With continuing reference to FIG. 3, the RU frontend interface 90 is provided in the existing RU system 94 and configured to receive the downlink multiplexed optical signal 120 over the existing downlink optical fiber 118. The RU frontend interface 90, which is different from the HEE frontend interface 88, is configured to transform the downlink multiplexed optical signal 120 into an existing downlink optical RF communications signal 122 and an add-on downlink optical RF communications signal 124. More detail about the RU frontend interface 90 is provided in reference to FIGS. 4 and 6 below. The existing downlink optical RF communications signal 122 is provided to an existing RU 126 via at least one existing RU downlink optical signal interface 128. An add-on RU 130 is added to the existing RU system 94 for receiving the add-on downlink optical RF communications signal 124 from at least one add-on RU downlink optical signal interface 132. O/E converters (not shown) are provided in the existing RU 126 and the add-on RU 130 to convert the existing downlink optical RF communications signal 122 and the add-on downlink optical RF communications signal 124 back into the at least one existing downlink electrical RF communications signal 104 and the at least one add-on downlink electrical RF communications signal 114, respectively. The at least one existing downlink electrical RF communications signal 104 and the at least one add-on downlink electrical RF communications signal 114 are provided to at least one antenna (not shown) in the existing RU system 94 for transmission to client devices (not shown). In this regard, the existing RU 126 provides an existing RU downlink communications signal path 134 in the existing RU system 94. Similarly, the add-on RU 130 provides an add-on RU downlink communications signal path 136 in the existing RU system 94.

In the uplink direction, at least one E/O converter (not shown) is provided in the existing RU 126 to convert at least one existing uplink electrical RF communications signal 138 into an existing uplink optical RF communications signal 140. Likewise, at least one E/O converter (not shown) is provided in the add-on RU 130 to convert at least one add-on uplink electrical RF communications signal 142 into an add-on uplink optical RF communications signal 144. The at least one existing uplink electrical RF communications signal 138 and the at least one add-on uplink electrical RF communications signal 142 are received from client devices (not shown) through the at least one antenna (not shown). The existing uplink optical RF communications signal 140 is provided to at least one existing RU uplink optical signal interface 146. In this regard, the existing RU 126 further provides an existing RU uplink communications signal path 148 in the RU system 94. The add-on uplink optical RF communications signal 144 is provided to at least one add-on RU uplink optical signal interface 150. In this regard, the add-on RU 130 further provides an add-on RU uplink communications signal path 152 in the RU system 94. The RU frontend interface 90 receives the existing uplink optical RF communications signal 140 and the add-on uplink optical RF communications signal 144 from the at least one existing RU uplink optical signal interface 146 and the at least one add-on RU uplink optical signal interface 150, respectively. The RU frontend interface 90 is further configured to transform the existing uplink optical RF communications signal 140 and the add-on uplink optical RF communications signal 144 into an uplink multiplexed optical signal 154 to be communicated over an existing uplink optical fiber 156 to the HEE frontend interface 88.

With continuing reference to FIG. 3, the HEE frontend interface 88 is further configured to transform the uplink multiplexed optical signal 154 into the at least one existing uplink electrical RF communications signal 138 and the at least one add-on uplink electrical RF communications signal 142. The at least one existing uplink electrical RF communications signal 138 is provided to at least one existing uplink RF signal interface 158. The at least one existing uplink electrical RF communications signal 138 is received by the existing RIM 98 and provided to the one or more wireless communications services (not shown). In this regard, the existing RIM 98 further provides an existing uplink communications signal path 160 in the HEE 92. The add-on uplink electrical RF communications signal 142 is provided to at least one add-on uplink RF signal interface 162. The add-on uplink electrical RF communications signal 142 is received by the add-on RIM 110 and provided to the respective one or more wireless communications services (not shown). In this regard, the add-on RIM 110 further provides an add-on uplink communications signal path 164 in the HEE 92. By including the HEE frontend interface 88 and the RU frontend interface 90 in the existing HEE 92 and the existing RU system 94, respectively, the add-on RU 130 can be added to support add-on RF bands and/or wireless communications services without the need to deploy new optical fibers.

Figure 4:
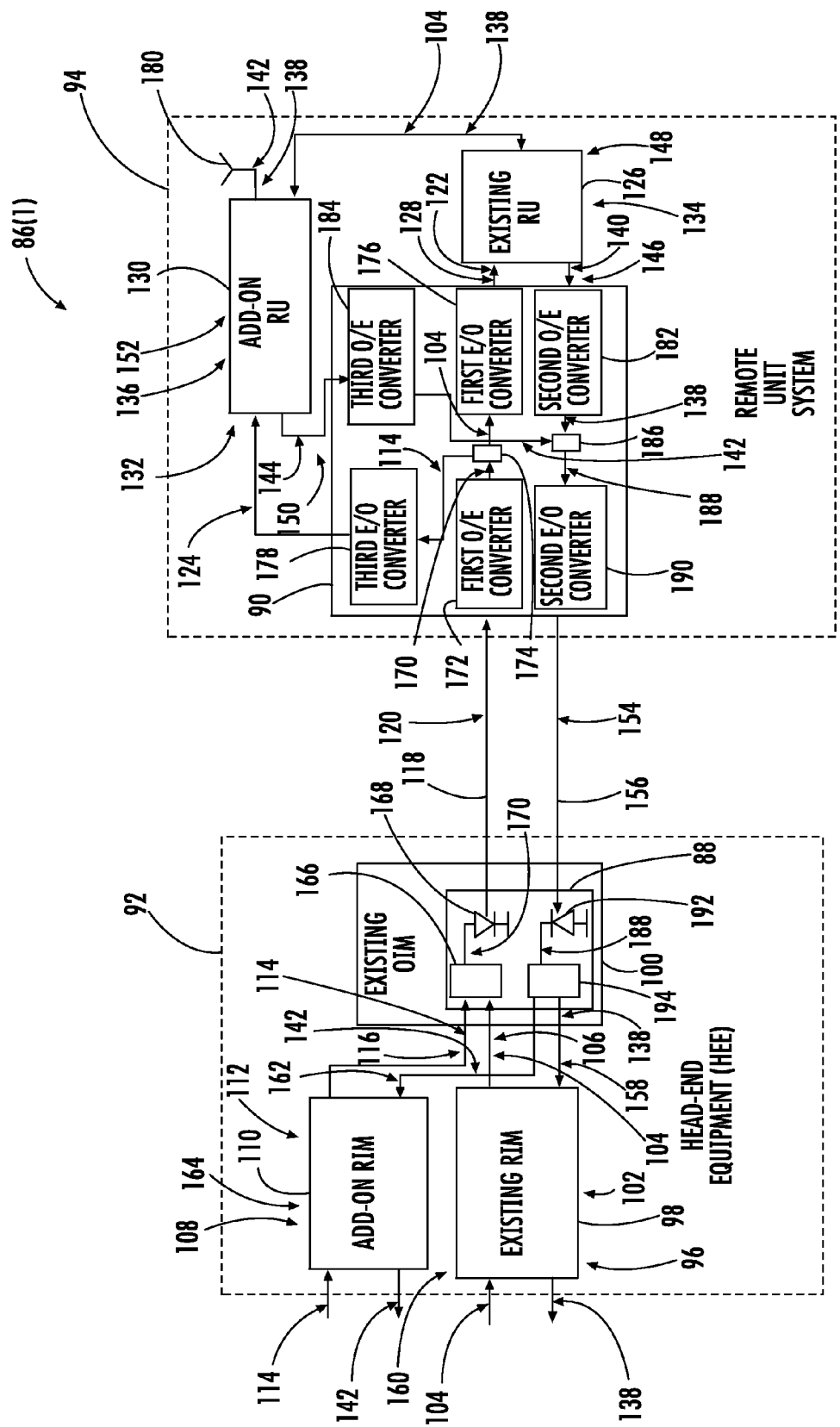
FIG. 4 is a schematic diagram of the exemplary optical fiber-based DAS of FIG. 3 with further illustrations of the HEE frontend interface and the RU frontend interface.
Figure 5:
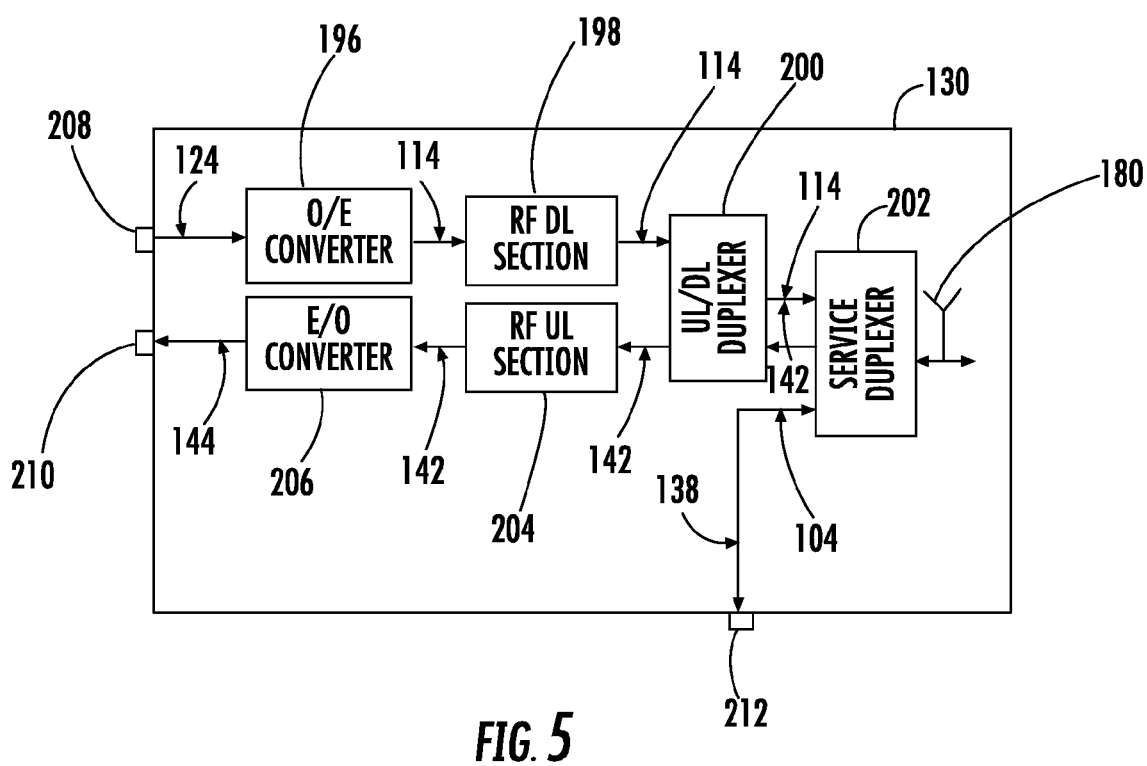
FIG. 5 is an exemplary schematic diagram of the add-on RU of FIG. 4 that interfaces with the RU frontend interface.

In this regard, FIG. 4 is a schematic diagram of an exemplary configuration of the optical fiber-based DAS 86 of FIG. 3 with further illustrations of the HEE frontend interface 88 and the RU frontend interface 90. Common elements and signals between FIG. 4 and FIG. 3 are shown with common element numbers, and thus will not be re-described here. In this regard, FIG. 4 provides an optical fiber-based DAS 86(1) comprising the existing HEE 92 and the existing RU system 94. Similarly, the existing HEE 92 has the HEE frontend interface 88 coupled to the at least one existing downlink RF signal interface 106 and the at least one add-on downlink RF signal interface 116. In a non-limiting example, the HEE frontend interface 88 comprises a RF multiplexer 166 and a laser diode 168. The RF multiplexer 166 is configured to RF multiplex the at least one existing downlink electrical RF communications signal 104 and the at least one add-on downlink electrical RF communications signal 114 into a downlink multiplexed RF signal 170. In a non-limiting example, the RF multiplexer 166 is a time-division multiplexer or a frequency-division multiplexer. The downlink multiplexed RF signal 170 is provided to the laser diode 168 and converted into the downlink multiplexed optical signal 120 to be communicated to the existing RU system 94 over the existing downlink optical fiber 118. In another non-limiting example, the RU frontend interface 90 comprises a first O/E converter 172 configured to receive the downlink multiplexed optical signal 120 over the existing downlink optical fiber 118. The first O/E converter 172 converts the downlink multiplexed optical signal 120 back into the downlink multiplexed RF signal 170 and provides the downlink multiplexed RF signal 170 to a RF de-multiplexer 174. The RF de-multiplexer 174 RF de-multiplexes the downlink multiplexed RF signal 170 back into the at least one existing downlink electrical RF communications signal 104 and the at least one add-on downlink electrical RF communications signal 114. The at least one existing downlink electrical RF communications signal 104 and the at least one add-on downlink electrical RF communications signal 114 are then provided to a first E/O converter 176 and a third E/O converter 178, respectively. The first E/O converter 176 converts the at least one existing downlink electrical RF communications signal 104 into the existing downlink optical RF communications signal 122 and provides the existing downlink optical RF communications signal 122 to the at least one existing RU downlink optical signal interface 128. Likewise, the third E/O converter 178 converts the at least one add-on downlink electrical RF communications signal 114 into the add-on downlink optical RF communications signal 124 and provides the add-on downlink optical RF communications signal 124 to the at least one add-on RU downlink optical signal interface 132. O/E converters (not shown), which are discussed in FIG. 5, are provided in the existing RU 126 and the add-on RU 130 to convert the existing downlink optical RF communications signal 122 and the add-on downlink optical RF communications signal 124 back to the at least one existing downlink electrical RF communications signal 104 and the at least one add-on downlink electrical RF communications signal 114 (not shown), respectively. The at least one existing downlink electrical RF communications signal 104 and the at least one add-on downlink electrical RF communications signal 114 (not shown) are provided to at least one antenna 180 in the existing RU system 94 for transmission to client devices (not shown).

With continuing reference to FIG. 4, the existing RU 126 and the add-on RU 130 receive the at least one existing uplink electrical RF communications signal 138 and the at least one add-on uplink electrical RF communications signal 142 from client devices (not shown) via the at least one antenna 180. E/O converters (not shown), which are discussed in FIG. 5, are provided in the existing RU 126 and the add-on RU 130 to convert the at least one existing uplink electrical RF communications signal 138 and the at least one add-on uplink electrical RF communications signal 142 into the at least one existing uplink optical RF communications signal 140 and the at least one add-on uplink optical RF communications signal 144, respectively. The at least one existing uplink optical RF communications signal 140 and the at least one add-on uplink optical RF communications signal 144 are then provided to the at least one existing RU uplink optical signal interface 146 and the at least one add-on RU uplink optical signal interface 150, respectively. In another non-limiting example, the RU frontend interface 90 comprises a second O/E converter 182 and a third O/E converter 184. The second O/E converter 182 receives the at least one existing uplink optical RF communications signal 140 from the at least one existing RU uplink optical signal interface 146 and converts the at least one existing uplink optical RF communications signal 140 back to the at least one existing uplink electrical RF communications signal 138. The third O/E converter 184 receives the at least one add-on uplink optical RF communications signal 144 from the at least one add-on RU uplink optical signal interface 150 and converts the at least one add-on uplink optical RF communications signal 144 back to the at least one add-on uplink electrical RF communications signal 142. The RU frontend interface 90 also comprises an RF multiplexer 186 configured to RF multiplex the at least one existing uplink electrical RF communications signal 138 and the at least one add-on uplink electrical RF communications signal 142 into an uplink multiplexed RF signal 188. In a non-limiting example, the RF multiplexer 186 is a time-division multiplexer or a frequency-division multiplexer. The uplink multiplexed RF signal 188 is received by a second E/O converter 190 and converted into the uplink multiplexed optical signal 154 to be communicated to the HEE frontend interface 88 over the existing uplink optical fiber 156. The HEE frontend interface 88 is coupled to the existing uplink optical fiber 156 to receive the uplink multiplexed optical signal 154. In another non-limiting example, the HEE frontend interface 88 further comprises a photodiode 192 that converts the uplink multiplexed optical signal 154 back to the uplink multiplexed RF signal 188. The HEE frontend interface 88 also comprises a RF de-multiplexer 194 configured to RF de-multiplex the uplink multiplexed RF signal 188 back to the at least one existing uplink electrical RF communications signal 138 and the at least one add-on uplink electrical RF communications signal 142. In a non-limiting example, the RF de-multiplexer 194 is a time-division de-multiplexer or a frequency-division de-multiplexer. Subsequently, the at least one existing uplink electrical RF communications signal 138 and the at least one add-on uplink electrical RF communications signal 142 are provided to the existing RIM 98 and the add-on RIM 110 via the at least one existing uplink RF signal interface 158 and the at least one add-on uplink RF signal interface 162, respectively.

To illustrate an exemplary internal structure of the add-on RU 130 of FIG. 4, FIG. 5 is provided. FIG. 5 is an exemplary schematic diagram of the add-on RU 130 that interfaces with the RU frontend interface 90 shown in FIG. 4. Elements of FIGS. 3 and 4 are referenced in connection with FIG. 5 and will not be re-described herein. In the add-on RU downlink communications signal path 136 (not shown), the add-on RU 130 comprises an O/E converter 196, which converts the at least one add-on downlink optical RF communications signal 124 into the at least one add-on downlink electrical RF communications signal 114. The at least one add-on downlink electrical RF communications signal 114 is further processed by a RF downlink section 198 and provided to an uplink/downlink duplexer 200. The uplink/downlink duplexer 200 in turn provides the at least one add-on downlink electrical RF communications signal 114 to a service duplexer 202, which then couples the at least one add-on downlink electrical RF communications signal 114 with the antenna 180 for over-the-air (OTA) transmission. The service duplexer 202 is also configured to receive the at least one existing downlink electrical RF communications signal 104 from the existing RU 126 (not shown). In this regard, the service duplexer 202 serves as a RF switch that alternately couples the at least one add-on downlink electrical RF communications signal 114 and the at least one existing downlink electrical RF communications signal 104 with the antenna 180 for OTA downlink transmissions. In the add-on RU uplink communications signal path 152 (not shown), the service duplexer 202 alternately provides the at least one add-on uplink electrical RF communications signal 142 and the at least one existing uplink electrical RF communications signal 138 to the uplink/downlink duplexer 200 and the existing RU 126 (not shown), respectively. The uplink/downlink duplexer 200, which alternates between the at least one add-on downlink electrical RF communications signal 114 and the at least one add-on uplink electrical RF communications signal 142, in turn provides the at least one add-on uplink electrical RF communications signal 142 to a RF uplink section 204. The at least one add-on uplink electrical RF communications signal 142 is further processed at the RF uplink section 204 and provided to an E/O converter 206 for converting to the at least one add-on uplink optical RF communications signal 144. To facilitate configuration in the existing RU system 94 (not shown), the add-on RU 130 further comprises a first connection port 208, a second connection port 210, and a third connection port 212. The first connection port 208 is configured to receive the at least one add-on downlink optical RF communications signal 124 from the existing RU system 94 (not shown). The second connection port 210 is configured to provide the at least one add-on uplink optical RF communications signal 144 to the existing RU system 94 (not shown). The third connection port 212 is configured to receive the at least one existing downlink electrical RF communications signal 104 from the existing RU 126 (not shown) and provide the at least one existing uplink electrical RF communications signal 138 to the existing RU 126 (not shown). Although FIG. 5 illustrates the antenna 180 that is shared by the add-on RU 130 and the existing RU 126 (not shown), it is also possible for the add-on RU 130 and the existing RU 126 (not shown) to communicate with client devices (not shown) via separate antennas. In a non-limiting example, the add-on RU 130 may use at least one add-on antenna (not shown) and the existing RU 126 (not shown) may use at least one existing antenna (not shown) for communications with client devices (not shown).

Figure 6:
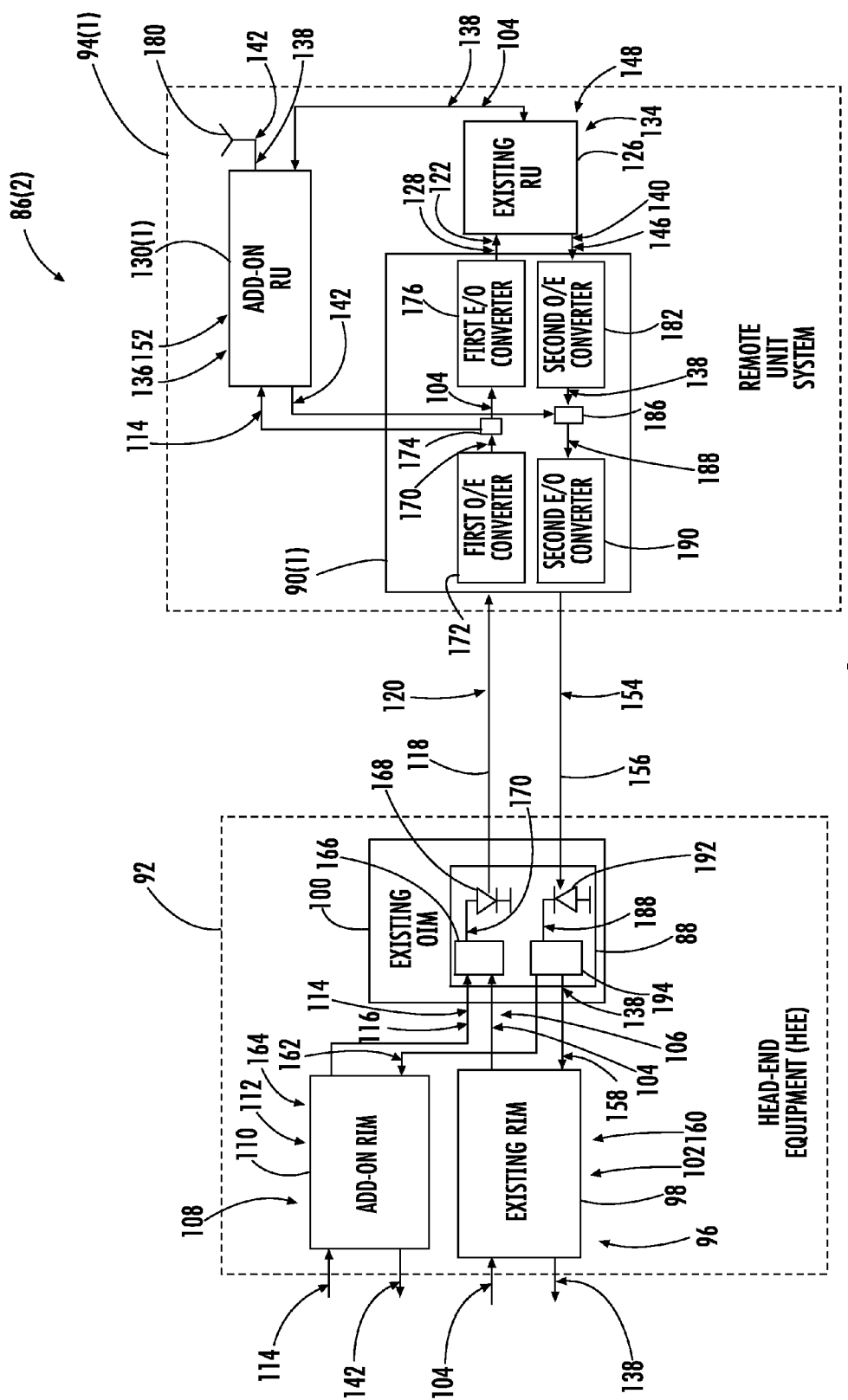
FIG. 6 is a schematic diagram of the exemplary optical fiber-based DAS having the same HEE as in FIG. 4, but with a RU frontend interface configured differently from the RU frontend interface in FIG. 4.

FIG. 6 is a schematic diagram of an exemplary optical fiber-based DAS 86(2) having the same HEE 92 as in FIG. 4, but with a RU frontend interface 90(1) configured differently from the RU frontend interface 90 in FIG. 4. Many elements and signals in FIG. 6 are common to the counterparts in FIG. 4 and thus will not be re-described herein. In the add-on RU downlink communications signal path 136, the add-on RU 130(1) is configured to receive the at least one add-on downlink electrical RF communications signal 114 as opposed to the at least one add-on downlink optical RF communications signal 124 received by the add-on RU 130 in FIG. 4. In the add-on RU uplink communications signal path 152, the add-on RU 130(1) is configured to provide the at least one add-on uplink electrical RF communications signal 142 as opposed to the at least one add-on uplink optical RF communications signal 144 provided by the add-on RU 130 in FIG. 4. As a result, the third E/O converter 178 and the third O/E converter 184 (shown in FIG. 4) may be eliminated from the RU frontend interface 90(1). Accordingly, the add-on RU 130(1) is configured to receive the at least one add-on downlink electrical RF communications signal 114 directly from the RF de-multiplexer 174 and provide the at least one add-on uplink electrical RF communications signal 142 directly to the RF multiplexer 186.

Figure 7:
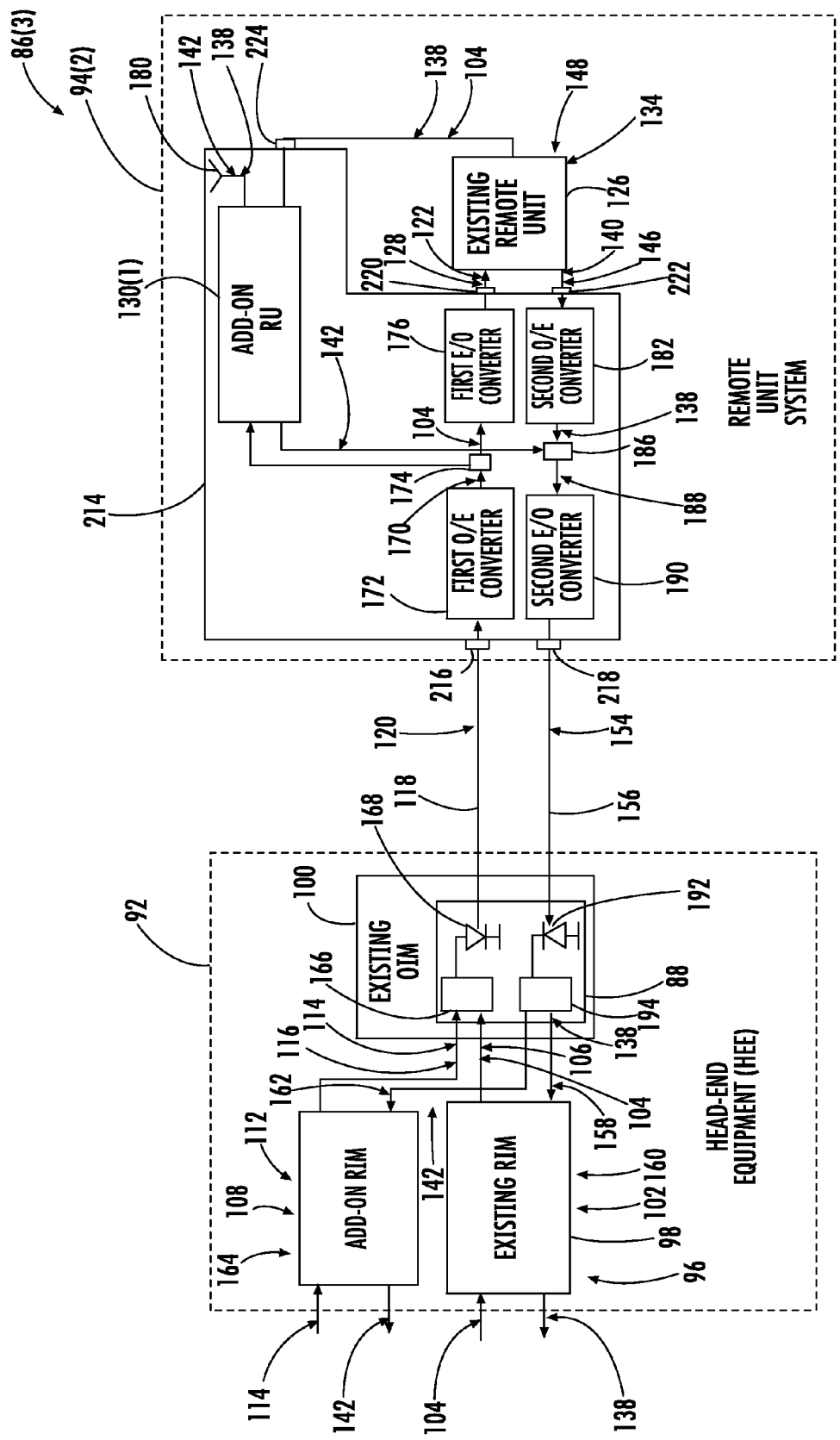
FIG. 7 is a schematic diagram of the exemplary optical fiber-based DAS wherein the add-on RU of FIG. 6 is integrated or packaged with the RU frontend interface of FIG. 6 to form a combined add-on RU.

In FIG. 6, the RU frontend interface 90(1) and the add-on RU 130(1) are provided in the existing RU system 94(1) of the optical fiber-based DAS 86(2) as separate entities. Alternatively, the RU frontend interface 90(1) in FIG. 6 may also be integrated or packaged with the add-on RU 130(1) as a single entity in an optical fiber-based DAS. In this regard, FIG. 7 is a schematic diagram of the exemplary optical fiber-based DAS 86(3) wherein the add-on RU 130(1) of FIG. 6 is integrated or packaged with the RU frontend interface 90(1) of FIG. 6 to form a combined add-on RU 214. Many elements and signals in FIG. 7 are identical to the counterparts in FIGS. 4 and 6 and thus will not be re-described herein. FIG. 7 provides an existing optical fiber-based DAS 86(3). The existing optical fiber-based DAS 86(3) has an existing RU system 94(2) that comprises the combined add-on RU 214. The combined add-on RU 214 comprises the add-on RU 130(1) and the RU frontend interface 90(1) (not shown). In a non-limiting example, the RU frontend interface 90(1) (not shown) and the add-on RU 130(1) are completely enclosed in the combined add-on RU 214, thus becoming indistinguishable from the outside. To facilitate installation and configuration, the combined add-on RU 214 is designed to provide a downlink optical signal port 216, an uplink optical signal port 218, a downlink optical RF communications signal port 220, an uplink optical RF communications signal port 212, and an antenna port 224. The downlink optical signal port 216 is connected to the existing downlink optical fiber 118 for receiving the downlink multiplexed optical signal 120. The uplink optical signal port 218 is connected to the existing uplink optical fiber 156 for communicating the uplink multiplexed optical signal 154. The downlink optical RF communications signal port 220 and the uplink optical RF communications signal port 222 are designed to conveniently connect the existing RU 126 to the combined add-on RU 214 for communicating the existing downlink optical RF communications signal 122 and receiving the existing uplink optical RF communications signal 140, respectively. The antenna port 224 is provided to allow the add-on RU 130(1) and the existing RU 126 to conveniently share the antenna 180.

Figure 8:
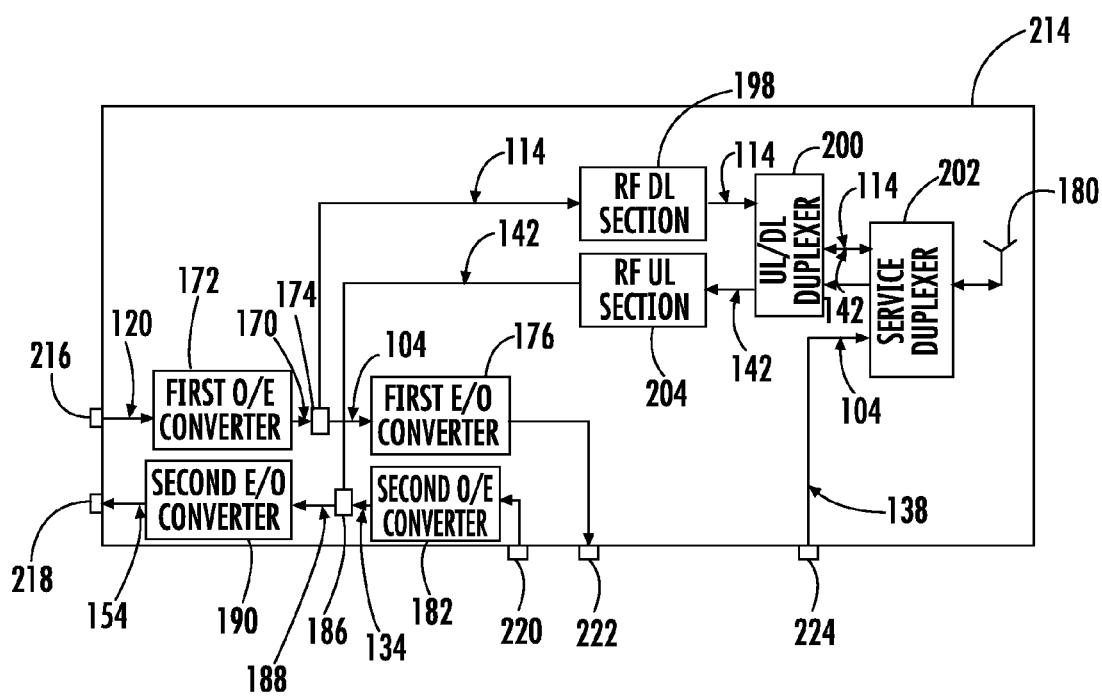
FIG. 8 is a schematic diagram of an exemplary configuration of the combined add-on RU of FIG. 7.

FIG. 8 is a schematic diagram of the exemplary combined add-on RU 214 of FIG. 7 that shares the antenna 180 with the existing RU 126 (not shown). In this regard, FIG. 8 provides an illustration of the combined add-on RU 214 of FIG. 7 with the internal configuration of the add-on RU 130 of FIG. 5. All of the elements and signals in FIG. 8 have been respectively introduced in reference to FIGS. 5 and 7, and thus will not be re-described herein for the sake of conciseness.

Figure 9:
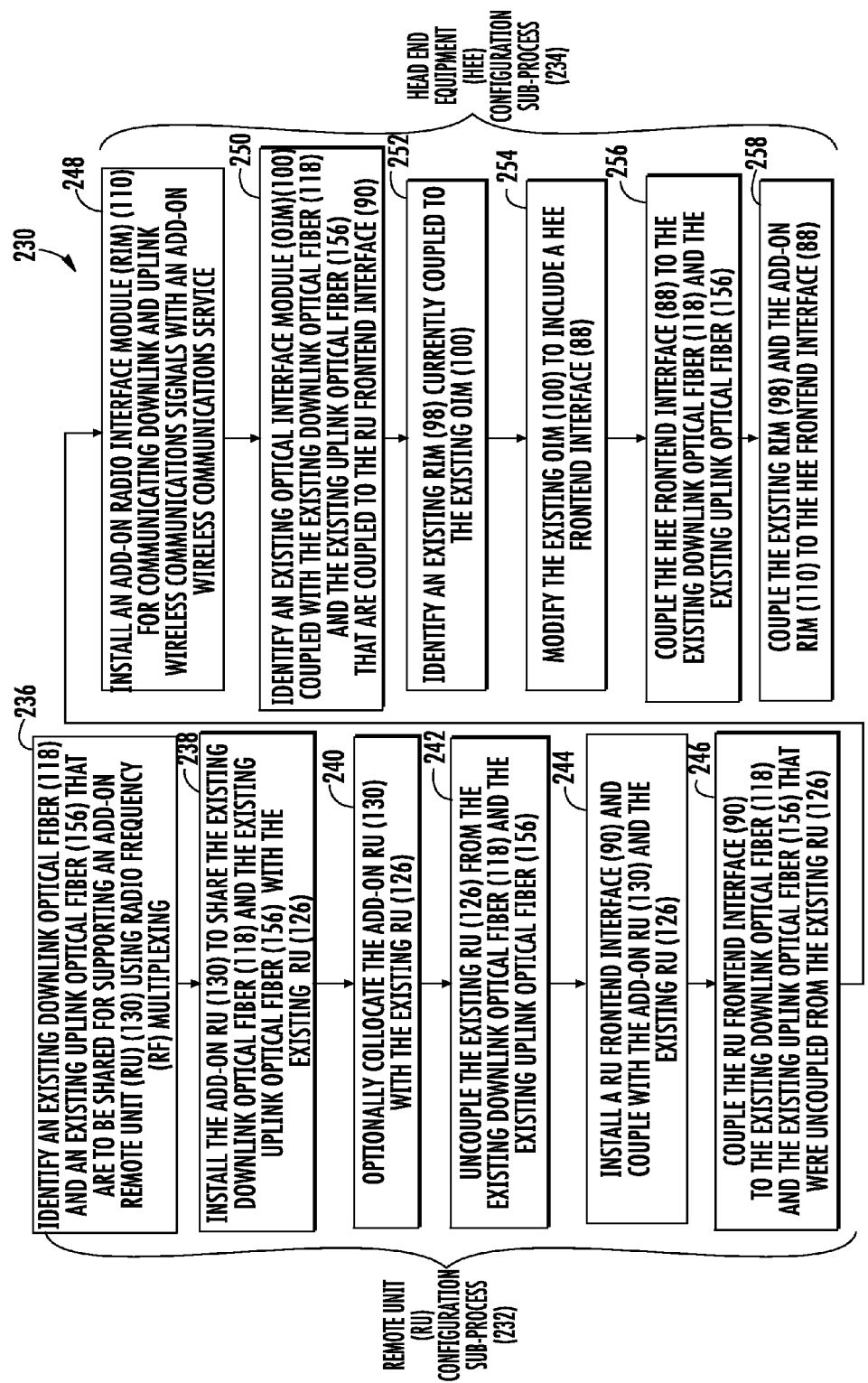
FIG. 9 is a flowchart of an exemplary configuration process for upgrading an optical fiber-based DAS to support an add-on RU over the existing optical fiber communications medium using radio frequency (RF) multiplexing and signal converters.

To upgrade the optical fiber-based DAS 86 in FIG. 3, FIG. 9 is a flowchart of an exemplary configuration process for upgrading the optical fiber-based DAS 86 to support an add-on RU 130 over the existing optical fiber communications medium using RF multiplexing. The configuration process 230 comprises a RU configuration sub-process 232 and a HEE configuration sub-process 234. The RU configuration sub-process 232 first identifies an existing downlink optical fiber 118 and an existing uplink optical fiber 156 that are to be shared for supporting an add-on RU 130 using RF multiplexing (block 236). Once the existing downlink optical fiber 118 and the existing uplink optical fiber 156 are identified, an existing RU 126 that is coupled to the existing downlink optical fiber 118 and the existing uplink optical fiber 156 can also be identified. The add-on RU 130 is then installed to share the existing downlink optical fiber 118 and the existing uplink optical fiber 156 with the existing RU 126 (block 238). Optionally, the add-on RU 130 may be collocated with the existing RU 126 (block 240). The existing RU 126 is then uncoupled from the existing downlink optical fiber 118 and the existing uplink optical fiber 156 (block 242). A RU frontend interface 90 is then installed and coupled to the existing RU 126 and the add-on RU 130 (block 244). The RU frontend interface 90 is then coupled with the existing downlink optical fiber 118 and the existing uplink optical fiber 156 that were uncoupled from the existing RU 126 (block 246). In the HEE configuration sub-process 234, an add-on RIM 110 may be installed for communicating downlink and uplink wireless communications signals with an add-on wireless communications service (block 248). This step is not always necessary because an existing RIM 98 may also be upgraded or reconfigured as an alternative to adding the add-on RIM 110 under certain circumstances. In order to share the existing downlink optical fiber 118 and the existing uplink optical fiber 156 that have been identified in the RU configuration sub-process 232, the HEE configuration sub-process 234 next identifies an existing OIM 100 that couples with the existing downlink optical fiber 118 and the existing uplink optical fiber 156 that are coupled to the RU frontend interface 90 (block 250). Subsequently, an existing RIM 98 currently coupled to the existing OIM 100 is also identified (block 252). The existing OIM 100 is then modified to include a HEE frontend interface 88 (block 254). The HEE frontend interface 88 is in turn coupled to the existing downlink optical fiber 118 and the existing uplink optical fiber 156 (block 256). Finally, the existing RIM 98 and the add-on RIM 110 are coupled to the HEE frontend interface 88 (block 258).

Figure 10:
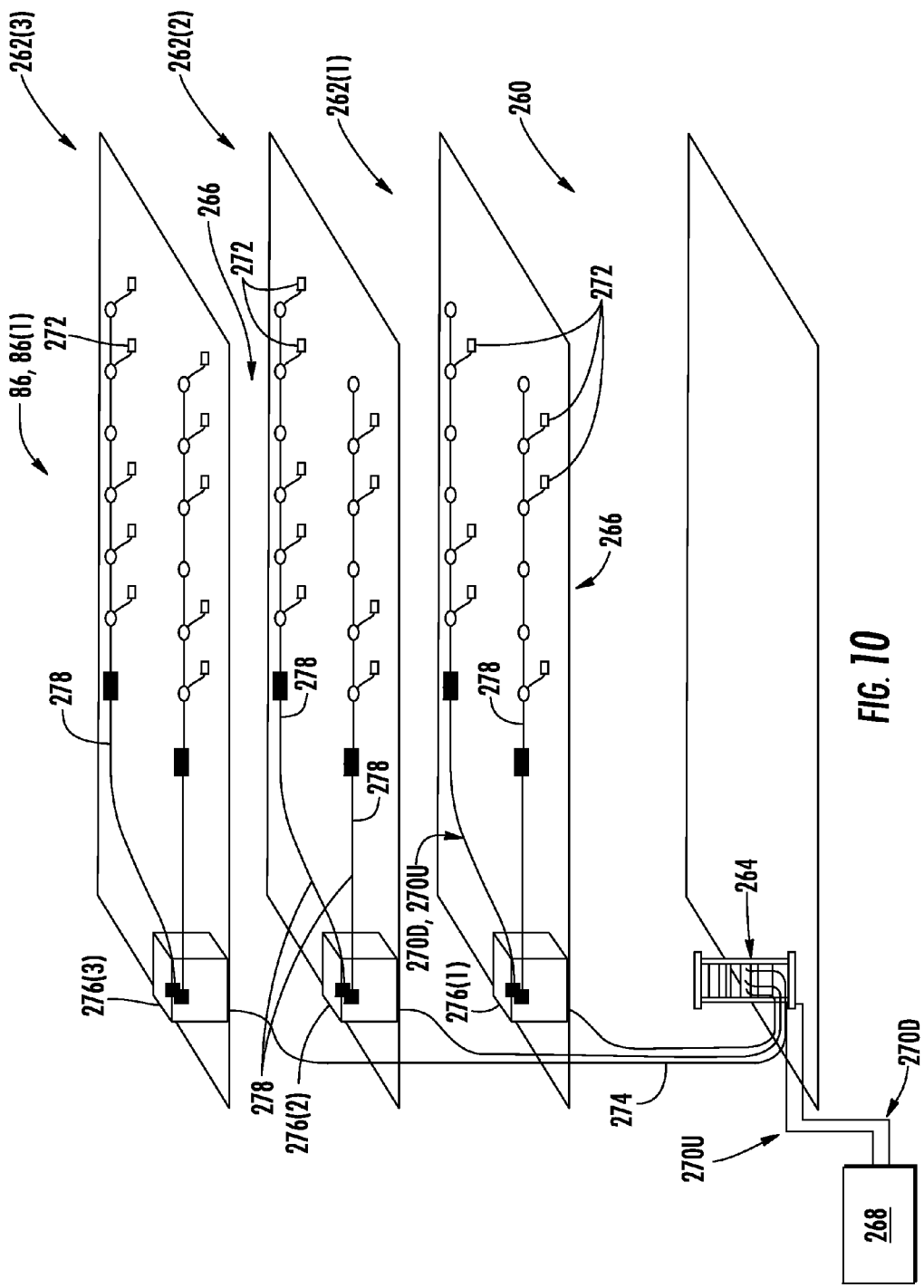
FIG. 10 is a partially schematic cut-away diagram of an exemplary building infrastructure in which the optical fiber-based DAS in FIGS. 3 and 4 can be employed.

The optical fiber-based DAS 86 in FIG. 3 and the optical fiber-based DAS 86(1) in FIG. 4 may be provided in an indoor environment, as illustrated in FIG. 10. FIG. 10 is a partially schematic cut-away diagram of an exemplary building infrastructure in which the optical fiber-based DASs 86 and 86(1) in FIGS. 3 and 4, respectively, can be employed. The building infrastructure 260 in this embodiment includes a first (ground) floor 262(1), a second floor 262(2), and a third floor 262(3). The floors 262(1)-262(3) are serviced by a central unit 264 to provide antenna coverage areas 266 in the building infrastructure 260. The central unit 264 is communicatively coupled to the base station 268 to receive downlink communications signals 270D from a base station 268. The central unit 264 is communicatively coupled to remote antenna units 272 to receive uplink communications signals 270U from the remote antenna units 272, as previously discussed above. The downlink and uplink communications signals 270D, 270U communicated between the central unit 264 and the remote antenna units 272 are carried over a riser cable 274. The riser cable 274 may be routed through interconnect units (ICUs) 276(1)-276(3) dedicated to each floor 262(1)-262(3) that route the downlink and uplink communications signals 270D, 270U to the remote antenna units 272 and also provide power to the remote antenna units 272 via array cables 278.

Figure 11:
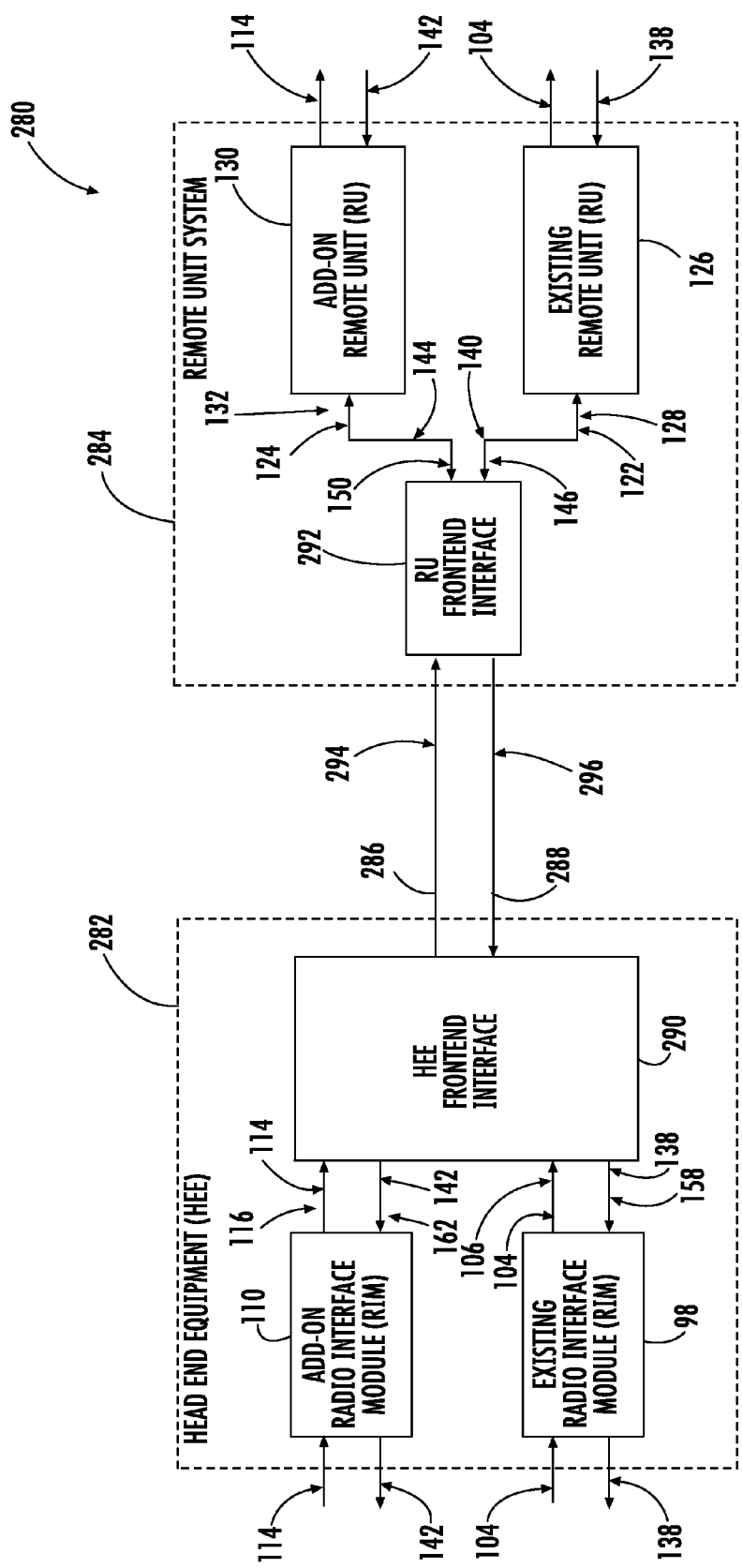
FIG. 11 is a schematic diagram of the exemplary optical fiber-based DAS of FIG. 3 that is adapted to support an add-on RU in a non-optical fiberbased DAS over an existing communications medium.

While FIG. 3 illustrates using the HEE frontend interface 88 and the RU frontend interface 90 to support the add-on RU 130 in the optical fiber-based DAS 86 over the existing optical fiber communications medium, the same approach may be adapted to support the add-on RU 130 in a non-optical fiber-based DAS 280. In this regard, FIG. 11 is a schematic diagram of the exemplary optical fiber-based DAS 86 of FIG. 3 that is adapted to support the add-on RU 130 in the non-optical fiber based DAS 280 over an existing communications medium. Many elements and signals in FIG. 11 are common to the counterparts in FIG. 3 and thus will not be re-described herein. The DAS 280 comprises a HEE 282 and a RU system 284. The HEE 282 is communicatively coupled to the RU system 284 over a downlink communications medium 286 and an uplink communications medium 288. In a non-limiting example, the downlink communications medium 286 and the uplink communications medium 288 may be wired communications medium, or wireless communications medium. A HEE frontend interface 290 and a RU frontend interface 292 are provided in the HEE 282 and the RU system 284, respectively. The HEE frontend interface 290 provides both downlink and uplink interfaces. On a HEE downlink, the HEE frontend interface 290 is coupled to the at least one existing downlink RF signal interface 106 and the at least one add-on downlink RF signal interface 116. The HEE frontend interface 290 is configured to transform the at least one existing downlink electrical RF communications signal 104 and the at least one add-on downlink electrical RF communications signal 114 into a combined downlink communications signal 294, which can be properly communicated over the downlink communications medium 286. On a HEE uplink, the HEE frontend interface 290 is coupled to the at least one existing uplink RF signal interface 158 and the at least one add-on uplink RF signal interface 162. The HEE frontend interface 290 is further configured to transform a combined uplink communications signal 296, which is received from the uplink communications medium 288, into the at least one existing uplink electrical RF communications signal 104 and the at least one add-on uplink electrical RF communications signal 142.

The RU frontend interface 292 also provides both downlink and uplink interfaces. On a RU system downlink, the RU frontend interface 292 is coupled to the at least one existing RU downlink optical signal interface 128 and the at least one add-on RU downlink optical signal interface 132. The RU frontend interface 292 is configured to transform the combined downlink communications signal 294 into the existing downlink optical RF communications signal 122 and the add-on downlink optical RF communications signal 124. On a RU system uplink, the RU frontend interface 292 is coupled to the at least one existing RU uplink optical signal interface 146 and the at least one add-on RU uplink optical signal interface 150. The RU frontend interface 292 is further configured to transform the at least one existing uplink optical RF communications signal 140 and the at least one add-on uplink optical RF communications signal 144 into the combined uplink communications signal 296, which can be properly communicated over the uplink communications medium 288.

The HEE frontend interface 290 and the RU frontend interface 292 may be adapted based on the downlink communications medium 286 and the uplink communications medium 288. The HEE frontend interface 290 and the RU frontend interface 292 may employ multiplexing and de-multiplexing techniques, such as time-division, frequency division, or wavelength division, to properly combine and separate downlink and uplink communication signals. The HEE frontend interface 290 and the RU frontend interface 292 may also employ E/O, O/E, analog-to-digital (A/D), and/or digital-to-analog (D/A) converters so as to properly generate and consume the combined downlink communications signal 294 and the combined uplink communications signal 296.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A remote unit (RU) system in an optical fiber-based distributed antenna system (DAS), comprising:
    an existing RU comprising an existing RU downlink communications signal path configured to convert at least one existing downlink optical radio frequency (RF) communications signal received from at least one existing RU downlink optical signal interface into at least one existing downlink electrical RF communications signal;
    an add-on RU comprising an add-on RU downlink communications signal path configured to convert at least one add-on downlink optical RF communications signal received from at least one add-on RU downlink optical signal interface into at least one add-on downlink electrical RF communications signal different from the at least one existing downlink electrical RF communications signal; and
    a RU frontend interface comprising:
        a first optical-to-electrical (O/E) converter coupled to a downlink optical fiber;
        an RF de-multiplexer coupled to the first O/E converter;
        a first electrical-to-optical (E/O) converter coupled to the RF de-multiplexer and at least one existing RU;
        a second O/E converter coupled to the at least one existing RU;
        a third O/E converter coupled to at least one add-on RU;
        an RF multiplexer coupled to the second O/E converter and the third O/E converter;
        a second E/O converter coupled to an uplink optical fiber and the RF multiplexer; and
        a third E/O converter coupled to the RF de-multiplexer and the at least one add-on RU;
    wherein the RU frontend interface is configured to:
        receive a downlink multiplexed optical signal over the downlink optical fiber;
        convert the downlink multiplexed optical signal into a downlink multiplexed RF signal;
        de-multiplex the downlink multiplexed RF signal and generate the at least one existing downlink electrical RF communications signal and the at least one add-on downlink electrical RF communications signal;

convert the at least one existing downlink electrical RF communications signal into the at least one existing downlink optical RF communications signal;

convert the at least one add-on downlink electrical RF communications signal into the at least one add-on downlink optical RF communications signal;

provide the at least one existing downlink optical RF communications signal to the existing RU downlink communications signal path via the at least one existing RU downlink optical signal interface; and provide the at least one add-on downlink optical RF communications signal to the add-on RU downlink communications signal path via the at least one add-on RU downlink optical signal interface.

2. The RU system of claim 1, wherein:

the existing RU further comprises an existing RU uplink communications signal path configured to:

receive and convert at least one existing uplink electrical RF communications signal into at least one existing uplink optical RF communications signal; and provide the at least one existing uplink optical RF communications signal to at least one existing RU uplink optical signal interface;

the add-on RU further comprises an add-on RU uplink communications signal path configured to:

receive and convert at least one add-on uplink electrical RF communications signal different from the at least one existing uplink electrical RF communications signal into at least one add-on uplink optical RF communications signal; and provide the at least one add-on uplink optical RF communications signal to at least one add-on RU uplink optical signal interface; and the RU frontend interface is coupled to the uplink optical fiber, the RU frontend interface further configured to:

receive the at least one existing uplink optical RF communications signal from the existing RU uplink communications signal path via the at least one existing RU uplink optical signal interface;

convert the at least one existing uplink optical RF communications signal into the at least one existing uplink electrical RF communications signal;

receive the at least one add-on uplink optical RF communications signal from the add-on RU uplink communications signal path via the at least one add-on RU uplink optical signal interface;

convert the at least one add-on uplink optical RF communications signal into the at least one add-on uplink electrical RF communications signal;

multiplex the at least one existing uplink electrical RF communications signal and the at least one add-on uplink electrical RF communications signal and generate an uplink multiplexed RF signal;

convert the uplink multiplexed RF signal into an uplink multiplexed optical signal; and provide the uplink multiplexed optical signal to the uplink optical fiber.

3. The RU system of claim 2, wherein:

the existing RU is further configured to:

receive the at least one existing downlink optical RF communications signal from the at least one existing RU downlink optical signal interface;

convert the at least one existing downlink optical RF communications signal to the at least one existing downlink electrical RF communications signal; and provide the at least one existing downlink electrical RF communications signal to at least one existing antenna; and the add-on RU is further configured to:

receive the at least one add-on downlink optical RF communications signal from the at least one add-on RU downlink optical signal interface;

convert the at least one add-on downlink optical RF communications signal to the at least one add-on downlink electrical RF communications signal; and provide the at least one add-on downlink electrical RF communications signal to at least one add-on antenna.

4. The RU system of claim 3, wherein:

the existing RU uplink communications signal path comprises the at least one existing RU, the at least one existing RU configured to:

receive the at least one existing uplink electrical RF communications signal via the at least one existing antenna;

convert the at least one existing uplink electrical RF communications signal to the at least one existing uplink optical RF communications signal; and provide the at least one existing uplink optical RF communications signal to the at least one existing RU uplink optical signal interface; and the add-on RU uplink communications signal path comprises the at least one add-on RU, the at least one add-on RU configured to:

receive the at least one add-on uplink electrical RF communications signal via the at least one add-on antenna;

convert the at least one add-on uplink electrical RF communications signal to the at least one add-on uplink optical RF communications signal; and provide the at least one add-on uplink optical RF communications signal to the at least one add-on RU uplink optical signal interface.

5. An optical fiber-based distributed antenna system (DAS), comprising:

a head end equipment (HEE), comprising:
  at least one existing radio interface;
  at least one add-on radio interface;
  at least one existing optical interface module (OIM) coupled to the at least one existing radio interface and the at least one add-on radio interface; and
  wherein the at least one existing OIM comprises a HEE frontend interface;

a remote unit (RU) system, further comprising:
  at least one existing RU;
  at least one add-on RU; and
  a RU frontend interface comprising:
    a first optical-to-electrical (O/E) converter coupled to a downlink optical fiber;
    a radio frequency (RF) de-multiplexer coupled to the first O/E converter and the at least one add-on RU;
    a first electrical-to-optical (E/O) converter coupled to the RF de-multiplexer and the at least one existing RU;
    a second O/E converter coupled to the at least one existing RU;
    an RF multiplexer coupled to the second O/E converter and the at least one add-on RU; and
    a second E/O converter coupled to the RF multiplexer and an uplink optical fiber;

the downlink optical fiber configured to connect the HEE frontend interface to the RU frontend interface; and the uplink optical fiber configured to connect the RU frontend interface to the HEE frontend interface.

6. The optical fiber-based DAS of claim 5, wherein the HEE frontend interface comprises:
   an HEE RF multiplexer coupled to the at least one existing radio interface and the at least one add-on radio interface;
   an E/O converter coupled to the HEE RF multiplexer and the downlink optical fiber;
   an HEE RF de-multiplexer coupled to the at least one existing radio interface and the at least one add-on radio interface; and
   an O/E converter coupled to the uplink optical fiber and the HEE RF de-multiplexer.

7. The optical fiber-based DAS of claim 6, wherein:
   the HEE RF multiplexer is a time-division multiplexer; and
   the HEE RF de-multiplexer is a time-division de-multiplexer.

8. The optical fiber-based DAS of claim 6, wherein:
   the HEE RF multiplexer is a frequency-division multiplexer; and
   the HEE RF de-multiplexer is a frequency-division de-multiplexer.

9. The optical fiber-based DAS of claim 6, wherein:
   the at least one existing radio interface is provided by at least one existing radio interface module (RIM); and
   the at least one add-on radio interface is provided by at least one add-on RIM.

10. The optical fiber-based DAS of claim 5, wherein the RU frontend interface is integrated with the at least one add-on RU to form at least one combined add-on RU.

11. The optical fiber-based DAS of claim 10, wherein the at least one combined add-on RU comprises:
    a downlink optical signal port;
    an uplink optical signal port;
    a downlink optical RF communications signal port;
    an uplink optical RF communications signal port; and
    an antenna port.

12. The optical fiber-based DAS of claim 5, wherein the at least one add-on RU comprises at least one add-on antenna, wherein the at least one existing RU is configured to share the at least one add-on antenna associated with the at least one add-on RU.

13. The optical fiber-based DAS of claim 5, wherein the at least one existing RU comprises at least one existing antenna, wherein the at least one add-on RU is configured to share the at least one existing antenna associated with the at least one existing RU.

\* \* \* \* \*